United States Patent
Han et al.

(10) Patent No.: US 10,678,383 B2
(45) Date of Patent: Jun. 9, 2020

(54) TOUCH MODULE FOR MULTIPLE TOUCH

(71) Applicant: 12CM GLOBAL PTE. LTD., Singapore (SG)

(72) Inventors: Jeong-Gyoun Han, Gyeonggi-do (KR); Jae-Hyung Kim, Seoul (KR)

(73) Assignee: 12CM GLOBAL PTE. LTD., Singapore (SG)

( * ) Notice: Subject to any disclaimer, the term of this patent is extended or adjusted under 35 U.S.C. 154(b) by 399 days.

(21) Appl. No.: 15/315,379

(22) PCT Filed: Jun. 1, 2015

(86) PCT No.: PCT/KR2015/005470
§ 371 (c)(1),
(2) Date: Nov. 30, 2016

(87) PCT Pub. No.: WO2015/186939
PCT Pub. Date: Dec. 10, 2015

(65) Prior Publication Data
US 2017/0220152 A1    Aug. 3, 2017

(30) Foreign Application Priority Data

Jun. 2, 2014 (KR) .................. 10-2014-0066717
Jun. 2, 2014 (KR) .................. 10-2014-0066718
(Continued)

(51) Int. Cl.
*G06F 3/044* (2006.01)
*G06F 21/36* (2013.01)
*G06F 3/041* (2006.01)

(52) U.S. Cl.
CPC ............ *G06F 3/044* (2013.01); *G06F 3/0418* (2013.01); *G06F 21/36* (2013.01); *G06F 2203/04104* (2013.01)

(58) Field of Classification Search
CPC ........ G06F 3/044; G06F 21/36; G06F 3/0418; G06F 2203/04104
See application file for complete search history.

(56) References Cited

U.S. PATENT DOCUMENTS

| 2012/0068962 A1 | 3/2012 | Yamamoto et al. |
| 2013/0069908 A1 | 3/2013 | Sung |

(Continued)

FOREIGN PATENT DOCUMENTS

| CN | 103038784 | 4/2013 |
| CN | 203276207 | 11/2013 |

(Continued)

OTHER PUBLICATIONS

Office Action dated Nov. 1, 2018 for Chinese Application No. 201580030299.8 and it English machine translation by Global Dossier.
(Continued)

*Primary Examiner* — Abhishek Sarma
(74) *Attorney, Agent, or Firm* — Ladas & Parry, LLP

(57) ABSTRACT

The present invention relates to a multiple touch module, and the multiple touch module according to the present invention includes, in a touch module touching a capacitive touch screen, a plurality of touch units each including a material which induces a capacitance change of the capacitive touch screen, and disposed in a geometric relation on a design projected on the capacitive touch screen in a predesigned unique geometric relation, and a touch film including a contact area which comes into contact with the capacitive touch screen, and configured to dispose and fix a certain number of touch units corresponding to the geometric relation on the design on an internal area provided on an opposite side of the contact area, or to come into contact with the certain number of touch units corresponding to the geometric relation on the design through the internal area (Continued)

when the multiple touch module touches the capacitive touch screen.

40 Claims, 41 Drawing Sheets

(30) Foreign Application Priority Data

| Jun. 5, 2014 | (KR) | 10-2014-0068395 |
|---|---|---|
| Jun. 9, 2014 | (KR) | 10-2014-0069164 |
| Jun. 9, 2014 | (KR) | 10-2014-0069168 |
| Jun. 9, 2014 | (KR) | 10-2014-0069173 |

(56) References Cited

U.S. PATENT DOCUMENTS

| 2013/0115878 A1* | 5/2013 | Thiele | G06K 7/081 |
| | | | 455/41.1 |
| 2014/0092062 A1 | 4/2014 | Yamamoto et al. | |
| 2014/0304806 A1 | 10/2014 | Koo | |
| 2015/0286294 A1* | 10/2015 | Kopcke | G06F 3/039 |
| | | | 345/163 |
| 2015/0293622 A1* | 10/2015 | Han | H04W 12/06 |
| | | | 345/174 |

FOREIGN PATENT DOCUMENTS

| EP | 2 724 761 | 4/2014 |
| JP | 2011-134298 | 7/2011 |
| JP | 2012-99093 | 5/2012 |
| JP | 2017-520836 | 7/2017 |
| KR | 10-2012-0099902 | 9/2012 |
| KR | 10-2013-0093855 | 8/2013 |
| TW | M432105 U | 6/2012 |
| WO | 2008/050468 | 5/2008 |
| WO | 2014/077657 | 5/2014 |

OTHER PUBLICATIONS

Office Action dated Jul. 8, 2019 for European Application No. 15 803 661.6.
Substantive Examination Report dated May 14, 2019 for Philippine Application No. 1/2016/502383.
Office Action dated Aug. 7, 2018 for Japanese Application No. 2016-571187 and it English machine translation by Global Dossier.
International Search Report for PCT/KR2015/005470 dated Jun. 30, 2015 and its English translation from WIPO.
Written Opinion of the International Searching Authority for PCT/KR2015/005470 dated Jun. 30, 2015 and its English machine translation by Google Translate.
Office Action dated Feb. 20, 2018 for Japanese Application No. 2016-571187 and it English machine translation by Global Dossier.
Written Opinion dated Aug. 20, 2018 for Singapore Application No. 11201610135T.
Substantive Examination Adverse Report dated Aug. 9, 2019 for Malaysian Application No. PI 2016704496.
Notice of Allowance dated Oct. 17, 2019 for Singapore Application No. 11201610135T.
Written Opinion dated Sep. 26, 2017 for Singapore Application No. 11201610135T.
Extended European Search Report dated Nov. 15, 2017 for European Patent Application No. 15803661.6.
International Preliminary Report on Patentability (Chapter I) dated Dec. 6, 2016 for PCT/KR2015/005470 and its English translation from WIPO.
Office Action dated Apr. 3, 2019 for Chinese Application No. 201580030299.8 and its English machine translation by Global Dossier.
Notice of Allowance dated Jan. 29, 2019 for Japanese Application No. 2016-571187 and its English machine translation by Global Dossier.

* cited by examiner

TOUCH MODULE FOR MULTIPLE TOUCH

CROSS-REFERENCE TO RELATED APPLICATIONS

This application is the U.S. National Stage of International Patent Application No. PCT/KR2015/005470 filed on Jun. 1, 2015, which claims the priority to Korean Patent Application No. 10-2014-0066717 filed in the Korean Intellectual Property Office on Jun. 2, 2014, Korean Patent Application No. 10-2014-0066718 filed in the Korean Intellectual Property Office on Jun. 2, 2014, Korean Patent Application No. 10-2014-0068395 filed in the Korean Intellectual Property Office on Jun. 5, 2014, Korean Patent Application No. 10-2014-0069164 filed in the Korean Intellectual Property Office on Jun. 9, 2014, Korean Patent Application No. 10-2014-0069168 filed in the Korean Intellectual Property Office on Jun. 9, 2014, and Korean Patent Application No. 10-2014-0069173 filed in the Korean Intellectual Property Office on Jun. 9, 2014, the entire contents of which are incorporated herein by reference.

TECHNICAL FIELD

The present invention fabricates a touch module by disposing a plurality of touch units including a material which induces a capacitance change in a predesigned unique geometric relation, blocks visual exposure outside of a geometric relation on a design for the plurality of touch units and a mechanical structure in which the plurality of touch units are touched and recognized on a capacitive touch screen, and at the same time prevents a recognition error and a distortion of the geometric relation at the time of a capacitive touch using a capacitive touch in which a certain number of touch units are disposed on or contacted with a touch film which is in contact with the capacitive touch screen.

BACKGROUND ART

Touch-based services, in which a plurality of touch units including a material which induces a capacitance change are disposed in a predesigned unique geometric relation, and the geometric relation of a plurality of touch points is recognized by touching a terminal of a fabricated touch module to the capacitive touch screen included in a terminal in a capacitive mode and read, and the geometric relation of the read points is used as an identification means and/or a certification means of a service provision, are provided.

In the touch-based service as described above, since the geometric relation formed by the touch points is used as the identification means and/or the certification means of a service provision, the geometric relation on the touch units disposed on the touch module should not be visually exposed outside because it. When the geometric relation of the touch units is exposed outside, a problem of easy illegal use of it including duplication or theft may occur.

Meanwhile, most capacitive touch screens which the touch module touches are optimized so that a capacitive touch using a human finger is used as a touch input means. Therefore, when touched using a capacitance of a human body, a special recognition error may not occur for multiple touches at two touch points or less. However, a minimum of three touch points should be multiply-touched to form a geometric relation of touch points, and more than four or five touch points should be multiply-touched to be used as an identification means and/or a certification means. However, when the number of touch points which are multiply-touched increases, a problem of all the touch units included in the touch module not being recognized and only a part of the touch units being recognized may occur under a certain condition. For example, for a partial capacitive touch screen, a circuit of a horizontal/vertical lattice structure may be formed on the touch screen, and in this case, when three or more points are multiply-touched in a horizontal direction or three of more points multiply-touched in a vertical direction and three or more points multiply-touched in the same circuit, the capacitance is dispersed, and a part of touch points may not be recognized. Particularly, when touch units included in a touch module do not directly touch the capacitive touch screen and a film exists between the touch units and the touch screen, there is a problem of the capacitance being dispersed and a further increase in a probability of non-recognition of a part of touch points.

DISCLOSURE

Technical Problem

An object of the present invention, which solves the problems as described above, provides a multiple touch module including a plurality of touch units including a material which induces a capacitance change and disposed in a predesigned unique geometric relation on a design projected on a capacitive touch screen, and a touch film which blocks visual exposure of the touch units between the plurality of touch units and the capacitive touch screen.

Another object of the present invention provides a multiple touch module which provides a capacitive touch in which a certain number of touch units corresponding to the geometric relation on the design are disposed on and fixed to an internal area included on an opposite side of a contact area of a touch film which is in contact with a capacitive touch screen, or the certain number of touch units corresponding to the geometric relation on the design are in contact with on the internal area when the multiple touch module touches the capacitive touch screen.

Still another object of the present invention provides a multiple touch module in which touch units disposed on and fixed to an internal area of a touch film or coming into contact with the internal area of the touch film by a pressure applied by a human hand are sequentially touched on a capacitive touch screen and recognized with a minute time difference, and therefore all the touch units included in the touch module are effectively touched and recognized without a recognition error even when the number of the touch units included in the touch module increases.

Particularly, the present invention may adjust the number of touch points which are simultaneously multiply-touched on the capacitive touch screen using a multiple touch with a minute time difference generated inside of the touch film even though the touch units touch the capacitive touch screen through the touch film without directly touching the capacitive touch screen.

Yet another object of the present invention provides a multiple touch module in which touch film included in the touch module is first touched on the capacitive touch screen and touch units which are then disposed on and fixed to the internal area of the touch film by a pressure or comes into contact with the internal area of the touch film, touch the capacitive touch screen and are recognized, and therefore a geometric relation of the touch units is not distorted due to a pressure applied in the touch process even when the touch units sequentially touch the capacitive touch screen with a minute time difference. When touch units having different heights are exposed outside and directly touch the capacitive touch screen, a higher touch unit may touch more area than a calculated area and a lower touch unit may touch less than the calculated area according to a magnitude of pressure applied to the touch module, and therefore a probability of generating a distortion of a geometric relation may increase. Even when touch units having different areas are disposed on touch module according to a height difference after the area distortion is corrected, when touch units having different heights directly touch the capacitive touch screen, a force direction with which the pressure is applied may be tilted in a specific direction by height difference, and the probability that the distortion of the geometric relation is generated may increase. However, the present invention may prevent the geometric relation from distorting by a plurality of touch units being contacted touch the capacitive touch screen after the touch film first contacting the capacitive touch screen, wherein the plurality of touch units is disposed and fixed on an internal area of the touch film.

Technical Solution

A multiple touch module according to the present invention, in a touch module touching a capacitive touch screen, includes a plurality of touch units each including a material which induces a capacitance change of the capacitive touch screen, and disposed in a geometric relation on a design projected on the capacitive touch screen in a predesigned unique geometric relation, and a touch film including a contact area which is in contact with the capacitive touch screen, and configured to dispose and fix a certain number of touch units corresponding to the geometric relation on the design on an internal area included on an opposite side of the contact area, or to come into contact with the certain number of touch units corresponding to the geometric relation on the design through the internal area when the multiple touch module touches the capacitive touch screen.

According to the present invention, the touch film may include a material capable of transferring capacitive touches of the plurality of touch units to the capacitive touch screen, and may include a material which blocks the geometric relation formed by the plurality of touch units so as not to visually exposed. Preferably, the plurality of touch units may include a material configured to be restorable after contraction.

According to the present invention, the plurality of touch units may be disposed and fixed so that at least one touch unit is higher than the other touch units. Here, the plurality of touch units may touch the capacitive touch screen in a capacitive mode sequentially starting from a highest touch unit.

According to the present invention, the multiple touch module may further include a frame unit which applies a capacitance of a human body to the touch units.

According to the present invention, the geometric relation on the design may include at least one relation of a distance relation and an angle relation between centers of respective touch units.

According to the present invention, the geometric relation on the design may include a geometric relation in which any one specified touch unit of the plurality of touch units is disposed and fixed on a certain position on the design. Here, the geometric relation on the design may include at least one relation of a distance relation and an angle relation between a center of the specified touch unit and centers of the remaining touch units. Further, the geometric relation on the design may include at least one relation of a distance relation and an angle relation between a reference point determined by the specified touch unit and centers of each of the touch units.

According to the present invention, the multiple touch module may further include a frame unit which disposes and fixes the plurality of touch units corresponding to the geometric relation on the design, and the touch film may come into contact with the touch units disposed on and fixed to the frame unit through the internal area. Here, the touch film may come into contact with the touch units disposed on and fixed to the frame unit by a pressure applied in one side direction when the multiple touch module touches the capacitive touch screen.

According to the present invention, the touch film may dispose and fix a part of the plurality of touch units corresponding to the geometric relation on the design, and the multiple touch module may further include a frame unit configured to dispose and fix the remaining touch units of the plurality of touch units corresponding to the geometric relation on the design. Here, the touch film may come into contact with the remaining touch units disposed on and fixed to the frame unit through the internal area, and the frame unit may be in contact with a part of the touch units disposed on and fixed to the internal area of the touch film.

According to the present invention, the touch film may dispose and fix the plurality of touch units corresponding to the geometric relation on the design, and the multiple touch module may further include a frame unit configured to be in contact with the touch units disposed on and fixed to the internal area of the touch film. Here, the frame unit may come in contact with the touch units disposed on and fixed to the internal area of the touch film by a pressure applied in one side direction when the multiple touch module touches the capacitive touch screen.

Meanwhile, a multiple touch module according to the present invention, in a touch module touching a capacitive touch screen, includes a plurality of touch units each including a material which induces a capacitance change of the capacitive touch screen, and disposed in a geometric relation on a design projected on the capacitive touch screen in a predesigned unique geometric relation, a frame unit configured to dispose and fix the plurality of touch units corresponding to the geometric relation on the design in the geometric relation on the design, and a touch film including a contact area which is in contact with the capacitive touch screen, and configured to come into contact with the touch units disposed and fixed to the frame unit through an internal area provided on an opposite side of the contact area.

Meanwhile, a multiple touch module according to the present invention, in a touch module touching a capacitive touch screen, includes a plurality of touch units each including a material which induces a capacitance change of the capacitive touch screen, and disposed in a geometric relation on a design projected on the capacitive touch screen in a predesigned unique geometric relation, a touch film including a contact area which is in contact with the capacitive touch screen, and configured to dispose and fix a part of the plurality of touch units corresponding to the geometric relation on the design on an internal area provided on an opposite side of the contact area, and a frame unit configured to dispose and fix touch units excluding touch units disposed on and fixed to an internal area of the touch film of the plurality of touch units. Here, the touch film may be in contact with touch units disposed on and fixed to the frame unit, and the frame units may be in contact with touch units disposed on and fixed to the internal area of the touch film.

Meanwhile, a multiple touch module according to the present invention, in a touch module touching a capacitive touch screen, includes a plurality of touch units each including a material which induces a capacitance change of the capacitive touch screen, and disposed in a geometric relation on a design projected on the capacitive touch screen in a predesigned unique geometric relation, a touch film including a contact area which is in contact with the capacitive touch screen, and configured to dispose and fix in the geometric relation on the design the plurality of touch units corresponding to the geometric relation on the design on an internal area provided on an opposite side of the contact area, and a frame unit configured to be in contact with touch units disposed and fixed to the internal area of the touch film.

Advantageous Effects

According to the present invention, geometric relations (e.g., a distance and/or an angle) of a plurality of touch units included in a touch module and mechanical structures (e.g., a height difference) of the touch units are blocked so that they are not visually exposed outside, and therefore the touch module has an advantage to be used as a credible identification means and/or a certification means of various touch-based services.

According to the present invention, touch units disposed on and fixed to an internal area of a touch film or coming in contact with the internal area of the touch film by a pressure applied by a human hand sequentially touch a touch screen and are recognized with a minute time difference, and therefore the touch module has an advantage that all the touch units included in the touch module are effectively touched and recognized without a recognition error even when the number of the touch units included in the touch module increases. For example, when four or more touch units included in the touch module directly contact and simultaneously touch a capacitive touch screen, the probability that a part of the touch units is not recognized under a specific condition may increase. However, the present invention has an advantage that four or more touch units touch the capacitive touch screen and are recognized altogether safely without an error compared to a case that four or more touch units are simultaneously and directly touched on the capacitive touch screen and recognized even when directly touched and passing through a touch film.

According to the present invention, touch films included in the touch module are first touched on the capacitive touch screen and touch units are then disposed on and fixed to the internal area of the touch film or comes in contact with the internal area of the touch film by a pressure, touch the capacitive touch screen and are recognized, and therefore the touch module has an advantage that even when the touch units sequentially touch the capacitive touch screen with a minute time difference, a geometric relation of the touch units is not distorted due to a pressure applied in the touch process.

BRIEF DESCRIPTION OF DRAWINGS

FIGS. 40 to 44 are diagrams illustrating a process of fabricating a touch module in accordance with another embodiment of the present invention.

MODE FOR INVENTION

Hereinafter, operation principles on preferable embodiments of the present invention will be described in detail with reference to accompanying drawings. However, drawings shown below and descriptions described below are for effectively describing features of the present invention, and the present invention is not limited to the drawings and descriptions described below.

That is, embodiments described below are corresponding to preferable embodiments of a union form, and it is obvious that an embodiment in which specific structure is omitted from embodiments described below, an embodiment in which a function embodied in a specific structure is divided into specific structures, an embodiment in which functions embodied in two or more structures are integrated into one structure, etc. are included in a scope of patent of the present invention although not specifically mentioned in the following examples.

Further, in the following descriptions, in describing the present invention, when it is determined that detailed description about related published function or structure obscure the subject of the present invention, the detailed description will be omitted. Further, terminologies described below are terminologies defined considering a function in the present invention, and these may be different according to a user, intention of an operator, or custom, etc. Therefore, the definition should be given based on overall contents of the present invention.

As a result, the inventive concept of the present invention is determined by the appended claims, and the following embodiments are only means for effectively describing the inventive concept of the present invention to those skilled in the art.

Figure 1:
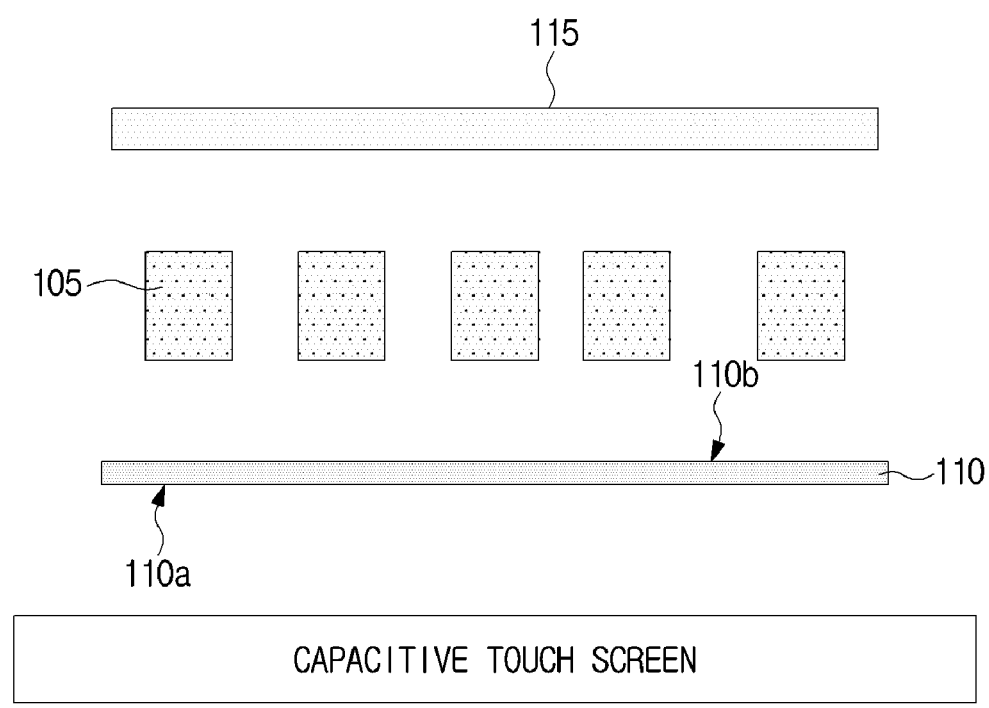
FIG. 1 is a diagram illustrating a relation between touch units and a touch film included in a touch module.

FIG. 1 is a diagram illustrating a relation between touch units 105 and a touch film 110 included in a touch module 100.

More specifically, FIG. 1 is a diagram illustrating a relation between touch units 105, a touch film 110, and a frame unit 115 included in a touch module 100 in which a plurality of touch units 105 including a material which induces capacitance change of a capacitive touch screen is disposed and fabricated in a predesigned unique geometric relation, and those skilled in the art may infer various embodiments for a relation between the touch units 105 and the touch film 110 by referencing and/or modifying FIG. 1. However, the present invention may include all the inferred embodiments, and the technical feature is not limited to the embodiment shown in FIG. 1.

Referring to FIG. 1, the touch module 100 includes a plurality of touch units 105 each including a material which induces capacitance change of the capacitive touch screen, and disposed in a predesigned unique geometric relation on design, and the touch film 110 including a contact area 110a contacting the capacitive touch screen, and configured to dispose and fix touch units 105 of a specified number corresponding to the geometric relation on design on/to an internal area 110b included on an opposite side of the contact area 110a, or contact the touch units 105 of the specified number corresponding to the geometric relation on design when the touch module 100 touches the capacitive touch screen, and further includes the frame unit 115 including a material which applies capacitance of a human body to the touch units 105.

The touch units 105 are collective terms for the composition including a capacitance-change inducing material capable of touching the capacitive touch screen in a capacitive mode, and it is preferable that the touch units 105 include a capacitance-change inducing material which is restorable after contraction by an external force (e.g., a pressure).

According to a first touch unit embodiment of the present invention, the touch units 105 may be fabricated using at least one conductive material having a rubber-elasticity of a conductive rubber material, a conductive plastic material, and a conductive silicone material, and for example the touch units 105 may be fabricated to have a predesigned hardness (e.g., 80 or lower based on a Shore A hardness tester) and a predesigned electric resistance (e.g., a measured resistance value between a touched portion and a portion electrically connected to a human body of 300 or lower).

According to a second touch unit embodiment of the present invention, the touch units 105 may be fabricated using a metallic material, and the metallic material may be any material when it is a metallic material having high electric conductivity (e.g., a measured resistance value between a touched portion and a portion electrically connected to a human body of lower than 1 Ohm) such as gold, silver, copper, aluminum, etc. However, the metallic material is hard to contract and restore, and therefore the metallic material may be provided in the touch module 100 in a form connected with a capacitance-change inducing material which is restorable after contraction.

According to a third touch unit embodiment of the present invention, the touch units 105 may be fabricated by coating a non-conductive material with a metallic material. Here, it is preferable that the non-conductive material include a material which is restorable after contraction. When the non-conductive material is not restorable after contraction, the non-conductive material may be provided in the touch module 100 in a form connected with another capacitance-change inducing material which is restorable after contraction.

According to a fourth touch unit embodiment of the present invention, the touch units 105 may be fabricated by forming a metal film of a metallic material on the outside surface of a bumper member having an elastic material which is restorable after contraction. The bumper member may include a foamed material such as sponge, polyurethane, etc., and the metal film may be fabricated by coating the bumper member with the metallic material and/or by thread spinning or cotton spinning the metallic material. For example, the touch units 105 may be formed in a gasket structure for EMI shielding.

According to a fifth touch unit embodiment of the present invention, the touch units 105 may be fabricated using a carbon fiber material including a carbon nanotube material or a single walled carbon nanotube material.

According to a sixth touch unit embodiment of the present invention, the touch units 105 may be fabricated using a dielectric material including a solid state dielectric material or a liquid state dielectric material and a vessel receiving the dielectric material. The dielectric material is a collective term for a material in which a polarization is generated by a voltage or an electric field and a bound charge is generated on a surface, and it is preferable that the dielectric material includes a ferroelectric material (e.g., barium titanate or Rochelle salt, etc.) having a dielectric constant so that a polarization is generated by a voltage or an electric field applied to a surface of a touch screen and a bound charge capable of inducing a capacitance change is generated.

According to a seventh touch unit embodiment of the present invention, the touch units 105 may have a combined form of the first to sixth touch unit embodiments (e.g., a form of a metallic material of the touch unit of the second embodiment combined with a material in which a metal film of a metallic material is formed on outside of a bumper material of an elastic material which is restorable after contraction).

Meanwhile, the touch unit embodiment of the present invention is not limited to the first to seventh touch unit embodiments, and it is obvious that any material can be included in a scope of a patent when the touch units include a material which induces capacitance change of a capacitive touch screen.

The touch units 105 fabricated using the first to seventh touch unit embodiments are fabricated including a contact surface having a calculated contact area so that the touch units 105 touch the capacitive touch screen. Preferably, the contact surface of the touch units 105 may be fabricated in a circle shape having a diameter of 3 to 7, or an oval shape or a polygon shape having a contact area corresponding to a circle area of a diameter of 3 to 7.

According to embodiments of the present invention, the plurality of touch units 105 may be fabricated so that each touch unit has the same height or at least one touch unit is higher than the other touch units 105 by a predetermined reference value or more. When the plurality of touch units 105 is fabricated so that the at least one touch unit of the touch units 105 is higher than the other touch units 105, the touch units 105 touch the capacitive touch screen in a capacitive mode sequentially starting from a highest touch unit 105. Meanwhile, even when the plurality of touch units 105 is fabricated so that each touch unit has the same height, the plurality of touch units 105 may touch the capacitive touch screen in a capacitive mode with a minute time difference while a pressure is applied to the frame unit 115 and the plurality of touch units 105 slides.

The touch film 110 is a collective term for the composition which includes a material capable of transferring a capacitance change generated by the touch units 105 to the capacitive touch screen, and preferably the touch film 110 is fabricated in a plane shape including a contact area 110a which contacts the capacitive touch screen. The touch film 110 may dispose and fix the touch units 105 on an internal area 110b provided on the opposite side of the contact area 110a included in the touch film 110, or may contact the touch units 105 disposed on and fixed to the frame unit 115.

According to embodiments of the present invention, the touch film 110 may be disposed on or fixed to the internal area 110b and/or may include a material capable of transferring a capacitance change generated by the touch units 105 to the capacitive touch screen. The touch film 110 may include at least one of a non-conductive material and a combination of a conductive material and the non-conductive material in view of an electric conductivity.

According to a first conductivity embodiment of a touch film material of the present invention, the touch film 110 may include the non-conductive material, and in this case it is preferable that the touch film 110 is fabricated with a thickness equal to or less than 0.2 mm. That is, though the touch film 110 is the non-conductive material when the thickness is equal to or less than 0.2 mm, it is possible to transfer 99% of a capacitance change of a capacitance-change inducing material included in the plurality of touch units 105 to the capacitive touch screen based on electric capacitance of a human body. However, the thickness of the touch film 110 including the non-conductive material may be varied to be proportional to a magnitude of a current or a voltage applied to a surface of the capacitive touch screen, or inversely proportional to resistance of the touch units 105 including a conductive material which transfers human electric capacitance, and it is obvious that the present invention includes even a case of the touch film 110 including the non-conductive material in a scope of a patent.

According to a second conductivity embodiment of a touch film material of the present invention, the touch film 110 may be fabricated so that a plurality of holes is formed in a lattice structure (or beehive structure) in the non-conductive material, and a metallic material passes through the plurality of holes and is plated on a predetermined area (e.g., about 2 mm) of both surfaces of the touch film 110 and plated holes are formed. In the third touch film embodiment, the metallic material passing through the plating holes and plated on the predetermined area of both surfaces performs a role of transferring a capacitance change of the touch units 105. Therefore, it is preferable that the plating holes are densely disposed (e.g., a distance between areas plated on both surfaces passing through the plating holes is about 2 mm). Meanwhile, when the touch film 110 is fabricated in a form of the plating holes, the thickness of the touch film 110 may not be limited by a specific numerical value, but a transfer rate of the capacitance change may be further improved when the thickness is 0.2 mm or less.

According to a third conductivity embodiment of a touch film material of the present invention, the touch film 110 may be fabricated so that a conductive material (e.g., a metallic material) is embedded inside of a plate of a non-conductive material and a conductive layer is formed. The conductive layer may have a shape of a plate or a net. In the third touch film embodiment, the thickness of the touch film 110 itself may not be limited by a specific numerical value, but it is preferable that the touch film 110 is fabricated so that a distance between the conductive layer and the capacitive touch screen is 0.2 mm or less when the touch film 110 contacts the capacitive touch screen.

According to a fourth conductivity embodiment of a touch film material of the present invention, the touch film 110 may be fabricated to have a form in which two or more of the first to third conductivity embodiments are combined. Meanwhile, the embodiment of the touch film 110 of the present invention is not limited to the above-described embodiments, and when the touch film 110 has a material or property capable of transferring a capacitance change generated by the touch units 105 to the capacitive touch screen, it is obvious that the touch film 110 can be included in a scope of a patent described in the claim whatever form or structure it has.

According to embodiments of the present invention, the touch film 110 may include a material configured to block the plurality of touch units 105 so that the geometric relation formed by the plurality of touch units disposed on or fixed to and/or contacting the internal area 110b is not exposed. The touch film 110, in view of a light transmission factor, may include at least one or a combination of two or more of an opaque material, an opaque material disposed on at least one side, a translucent material, a translucent material disposed on at least one side, a transparent material, a transparent material disposed on at least one side, a transmission-factor changing material, and a transmission-factor changing material disposed on at least one side.

According to a first transmission factor embodiment of a touch film material of the present invention, the touch film 110 may include an opaque material capable of transferring a capacitance change generated by a capacitance-change inducing material to the capacitive touch screen. Here, it is ideal that the opaque material includes a material having a transmission factor of a light incident on the touch film 110 of 0%, but even a light transmission factor in which a specified geometric relation of the plurality of touch units 105 is not visually discriminated is defined to be included in the opaque material, and the numerical value may include to the light transmission factor of less than 5%.

According to a second transmission factor embodiment of a touch film material of the present invention, the touch film 110 may include, on at least one side, an opaque material capable of transferring a capacitance change generated by a capacitance-change inducing material to the capacitive touch screen. For example, the touch film 110 may include a transparent material or a translucent material on the other side, and may include a layer or a film of an opaque material or include a form in which an opaque material is coated or painted on the at least one side.

According to a third transmission factor embodiment of a touch film material of the present invention, the touch film 110 may include a translucent material capable of transferring a capacitance change generated by a capacitance-change inducing material to the capacitive touch screen. Here, the translucent material refers to a material in which a transmission factor of a light incident on the touch film 110 is not included in a scope of the opaque material and the transparent material.

According to a fourth transmission factor embodiment of a touch film material of the present invention, the touch film 110 may include, on at least one side, a translucent material capable of transferring a capacitance change generated by a capacitance-change inducing material to the capacitive touch screen. For example, the translucent material touch film 110 may include a transparent material or an opaque material on the other side, and may include a layer or a film of a translucent material or include a form in which a translucent material is coated or painted on the at least one side.

According to a fifth transmission factor embodiment of a touch film material of the present invention, the touch film 110 may include a transparent material capable of transferring a capacitance change generated by a capacitance-change inducing material to the capacitive touch screen. Here, it is ideal that the transparent material includes a material having a transmission factor of a light incident on the touch film 110 of 100%, but even a material having the light transmission factor of 95% or more may be defined to be included in the transparent material.

According to a sixth transmission factor embodiment of a touch film material of the present invention, the touch film 110 may include, on at least one side, a transparent material capable of transferring a capacitance change generated by a capacitance-change inducing material to the capacitive touch screen. For example, the touch film 110 may include an opaque material or a translucent material on the other side, and may include a layer or a film of a transparent material or include a form in which a transparent material is coated or painted on the at least one side.

According to a seventh transmission factor embodiment of a touch film material of the present invention, the touch film 110 may include a transmission-factor changing material capable of transferring a capacitance change generated by a capacitance-change inducing material to the capacitive touch screen. Here, the transmission-factor changing material is a collective term for a material in which the transmission factor is changed by an electric signal, and for example may include a transmission-factor changing glass material. However, the transmission-factor changing material is not limited to the transmission-factor changing glass material, and when the touch film 110 has a transmission-factor changing material capable of transferring a capacitance change generated by the capacitance-change inducing material to the capacitive touch screen, it is obvious that the touch film 110 can be included in a scope of a patent described in the claim whatever material it includes.

According to an eighth transmission factor embodiment of a touch film material of the present invention, the touch film 110 may include, on at least one side, a transmission-factor changing material capable of transferring a capacitance change generated by a capacitance-change inducing material to the capacitive touch screen. For example, the touch film 110 may include a transparent material, a translucent material, or an opaque material on the other side, and may include a layer or a film of a transmission-factor changing material or include a form in which a transmission-factor changing material is coated or painted on the at least one side.

According to an nineth transmission factor embodiment of a touch film material of the present invention, the touch film 110 may be fabricated to have a form in which two or more of the first to eighth transmission factor embodiments are combined. Meanwhile, the embodiment of the touch film 110 of the present invention is not limited to the above-described embodiments, and when the touch film 110 has a material or property capable of transferring a capacitance change generated by the touch units 105 to the capacitive touch screen, it is obvious that the touch film 110 can be included in a scope of a patent described in the claim whatever light transmission factor it has.

According to embodiments of the present invention, when the contact area 110a of the touch film 110 contacts the capacitive touch screen, a capacitive touch is generated on the capacitive touch screen by the touch units 105 disposed on and fixed to the internal area 110b of the touch film 110 and/or contacting the internal area 110b of the touch film 110.

According to a first touch unit disposition embodiment of the present invention, the plurality of touch units 105 may be disposed on and fixed to the frame unit 115 and, in this case, the frame unit 115 disposes and fixes the plurality of touch units 105 in a predesigned unique geometric relation on design. When the touch module 100 in which the plurality of touch units 105 is disposed on and fixed to the frame unit 115 touches the capacitive touch screen, a plurality of touch points touches the capacitive touch screen and is recognized according to a geometric relation on design of the touch units 105 disposed on and fixed to the frame unit 115. That is, in the first touch unit disposition embodiment, the frame unit 115 disposes and fixes the plurality of touch units 105 in a geometric relation on design projected on the capacitive touch screen.

According to a second touch unit disposition embodiment of the present invention, the plurality of touch units 105 may be disposed on and fixed to the internal area 110b of the touch film 110 and, in this case, the internal area 110b of the touch film 110 disposes and fixes the plurality of touch units 105 in a predesigned unique geometric relation on design. When the touch module 100 in which the plurality of touch units 105 is disposed on and fixed to the internal area 110b of the touch film 110 touches the capacitive touch screen, a plurality of touch points touches the capacitive touch screen and is recognized according to a geometric relation on design of the touch units 105 disposed on and fixed to the internal area 110b of the touch film 110. That is, in the second touch unit disposition embodiment, the internal area 110b of the touch film 110 disposes and fixes the plurality of touch units 105 in a geometric relation on design projected on the capacitive touch screen.

According to a third touch unit disposition embodiment of the present invention, a part of the plurality of touch units 105 may be disposed on and fixed to the internal area 110b of the touch film 110 and the rest touch units 105 may be disposed on and fixed to the frame unit 115. In the third touch unit disposition embodiment, the geometric relation on design disposing the plurality of touch units 105 is defined as a geometric relation in which a disposed position of a part of the plurality of touch units 105 disposed on and fixed to the internal area 110b of the touch film 110 and a disposed position of the rest touch units 105 disposed on and fixed to the frame unit 115 are combined. That is, in the third touch unit disposition embodiment, the geometric relation on design includes a geometric relation of the touch units 105 in which a disposed position of a part of the plurality of touch units 105 disposed on and fixed to the internal area 110b of the touch film 110 and a disposed position of the rest touch units 105 disposed on and fixed to the frame unit 115 are combined and projected on the capacitive touch screen.

In the first to third touch unit disposition embodiment, the geometric relation on design which disposes the plurality of touch units 105 may include at least one relation of a distance relation on design between centers of respective touch units 105, an angle relation on design between centers of respective touch units, and a combination of the distance relation on design and the angle relation on design between centers of respective touch units 105.

According to embodiments of the present invention, the geometric relation on design which disposes the plurality of touch units 105 may include a geometric relation in which one specified touch unit 105 of the plurality of touch units 105 is disposed on and fixed to a fixed position predetermined on design. Here, the geometric relation on design may include at least one relation of a distance relation on design and an angle relation on design between a center of the specified touch unit 105 and centers of the other touch units 105, and a combination of the distance relation on design and the angle relation on design between a center of the specified touch unit 105 and centers of the other touch units 105. Meanwhile, the specified touch unit 105 disposed on and fixed to a fixed position predetermined on design may be an indicator which sets a reference point of the geometric relation on design. Here, the geometric relation on design may include at least one relation of a distance relation on design and an angle relation on design between a reference point determined by the specified touch unit 105 and a center of each touch unit 105, and a combination of the distance relation on design and the angle relation on design between the reference point determined by the specified touch unit 105 and the center of each touch unit 105. The specified touch unit 105 or the reference point provides a reference for reading out the geometric relation of touch points whatever position or in whatever direction of the capacitive touch screen the touch module 100 touches.

FIGS. 2 to 5 are diagrams illustrating a relation among touch units 105, a touch film 110, and a frame unit 115 included in a touch module 100 in accordance with a first embodiment of the present invention.

More specifically, FIGS. 2 to 5 illustrate embodiments in which the plurality of touch units 105 each having the same height are disposed on and fixed to the internal area 110b of the touch film 110 in a predesigned unique geometric relation on design.

Figure 2:
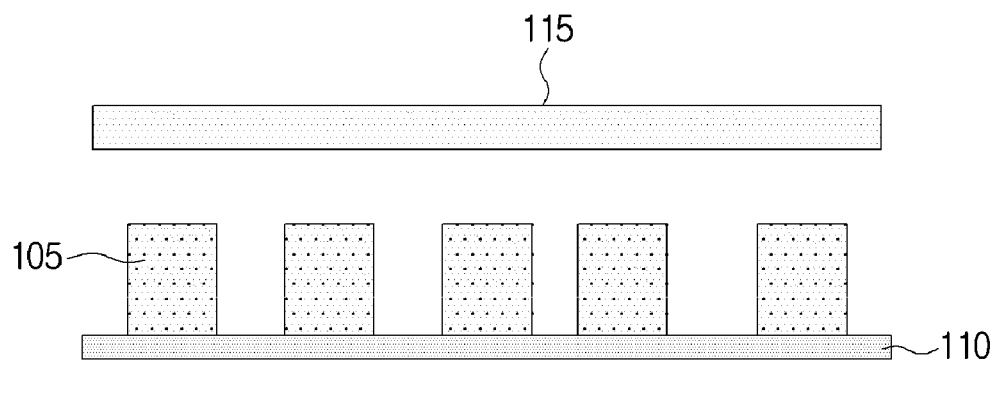
FIGS. 2 to 5 are diagrams illustrating a relation among touch units, a touch film, and a frame unit included in a touch module in accordance with a first embodiment of the present invention.

The touch module 100 of FIG. 2 includes the touch film 110 including the internal area 110b which disposes and fixes the plurality of touch units 105 each having the same height in a predesigned unique geometric relation on design, and includes the frame unit 115 which is separated from the touch units 105 disposed on and fixed to the internal area 110b of the touch film 110 by a specified distance or more after the contact area 110a of the touch film 110 contacts the capacitive touch screen and before a pressure is applied.

Figure 3:
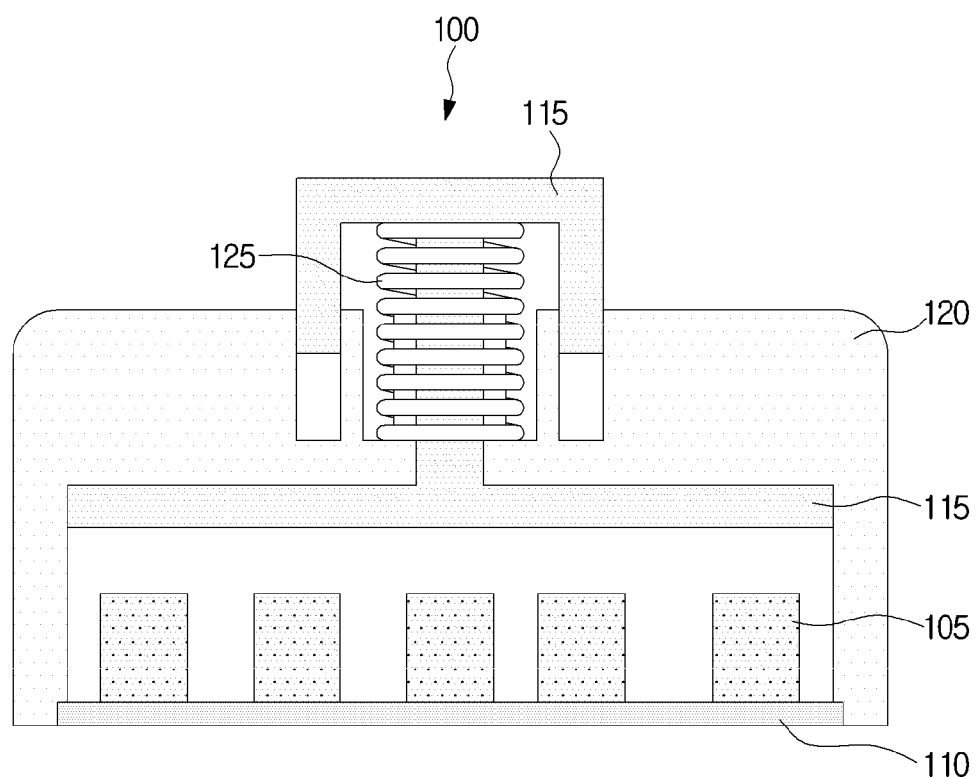

Referring to FIG. 3, the touch module 100 includes a housing unit 120 which fixes the touch film 110 and protects the touch units 105 disposed on and fixed to the internal area 110b of the touch film 110. The touch film 110 is fixed to the housing unit 120, and the touch units 105 disposed on and fixed to the internal area 110b of the touch film 110 are not visually exposed outside by the touch film 110 and the housing unit 120.

The frame unit 115 having a facing surface capable of contacting the touch units 105 disposed on and fixed to the internal area 110b of the touch film 110 is provided inside of the housing unit 120. One side of the frame unit 115 protrudes outside and receives electric capacitance of a human body which grasps the touch module 100 with a hand. Meanwhile, the frame unit 115 protruding outside of the housing unit 120 may be connected to a holder unit 130 which may be grasped by a hand of a human body, and the holder unit 130 may include a conductive material electrically connected to the frame unit 115.

Referring to FIG. 3, the touch module 100 includes a spring 125 which separates the touch units 105 disposed on and fixed to the internal area 110b of the touch film 110 from the frame unit 115 by a specified distance or more after the contact area 110a of the touch film 110 contacts the capacitive touch screen and before a pressure is applied. Meanwhile, the spring 125 may be omitted as an embodiment of FIG. 5.

Figure 4:
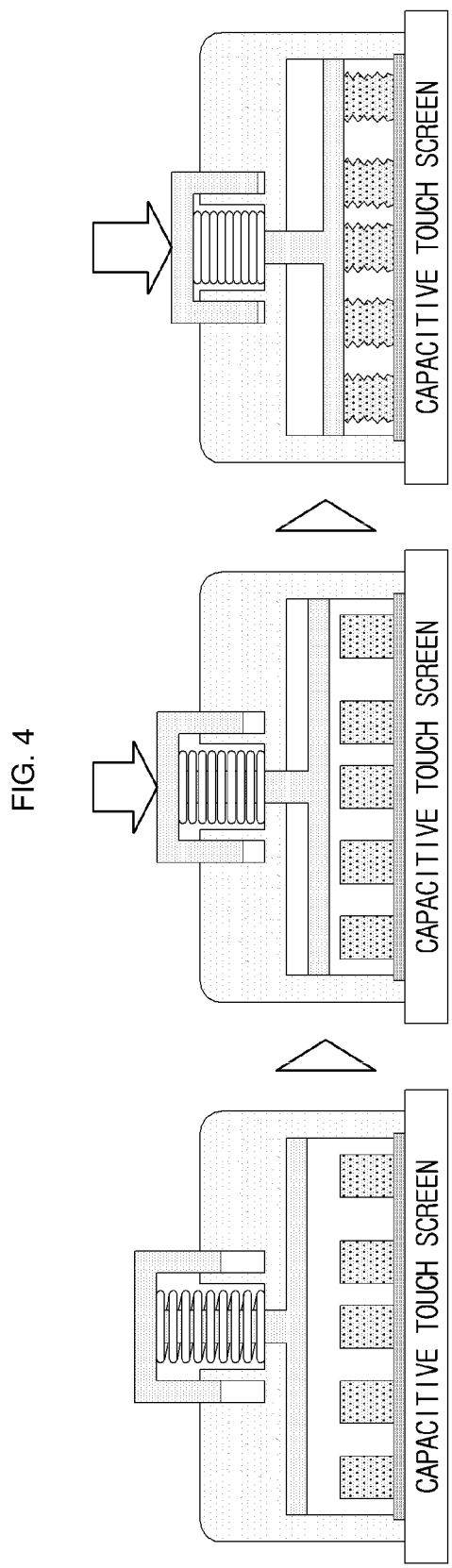
Figure 5:
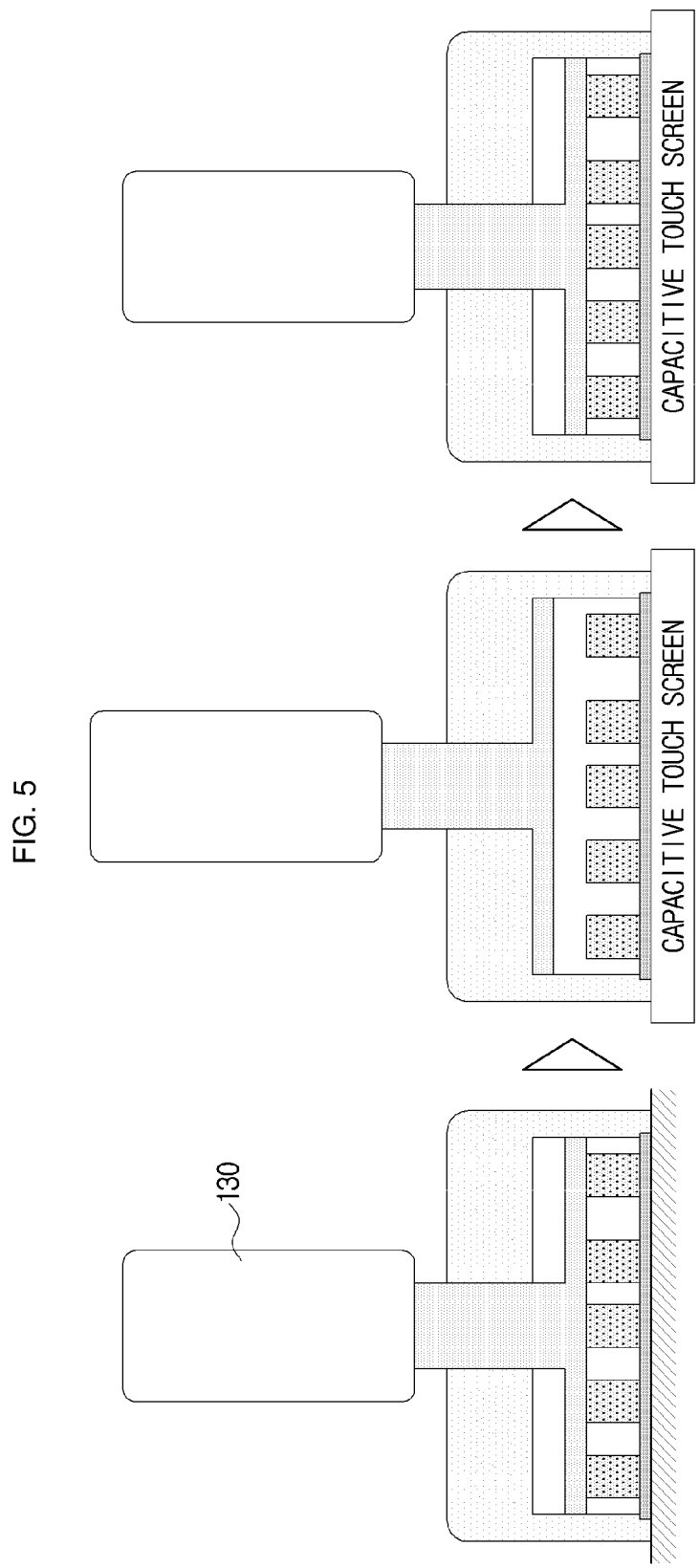

Referring to FIG. 4, in the state that the contact area 110a of the touch film 110 contacts the capacitive touch screen, when a pressure is applied, the frame unit 115 contacts the touch units 105 disposed on and fixed to the internal area 110b of the touch film 110, at this time capacitance of the human body which applies the pressure is applied to the touch units 105 disposed on and fixed to the internal area 110b of the touch film 110 through the frame unit 115, and the plurality of touch units 105 disposed on and fixed to the internal area 110b of the touch film 110 touch the capacitive touch screen and are recognized in a predesigned unique geometric relation on design.

FIGS. 6 to 9 are diagrams illustrating a relation among touch units 105, a touch film 110, and a frame unit 115 included in a touch module 100 in accordance with a second embodiment of the present invention.

More specifically, FIGS. 6 to 9 illustrate embodiments in which the plurality of touch units 105 each having the same height are disposed on and fixed to the frame unit 115 in a predesigned unique geometric relation on design.

Figure 6:
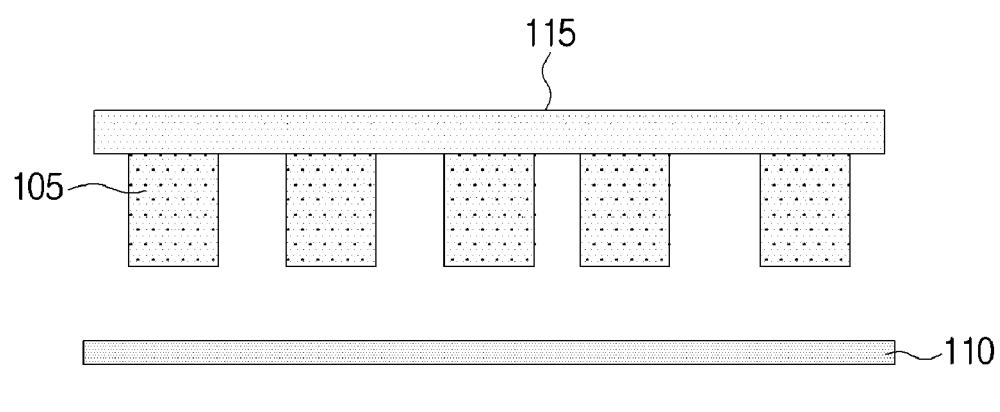
FIGS. 6 to 9 are diagrams illustrating a relation among touch units, a touch film, and a frame unit included in a touch module in accordance with a second embodiment of the present invention.

The touch module 100 of FIG. 6 includes the frame unit 115 which disposes and fixes the plurality of touch units 105 each having the same height in a predesigned unique geometric relation on design, and includes the touch film 110 which is separated from the touch units 105 disposed on and fixed to the frame unit 115 by a specified distance or more after the contact area 110a of the touch film 110 contacts the capacitive touch screen and before a pressure is applied.

Figure 7:
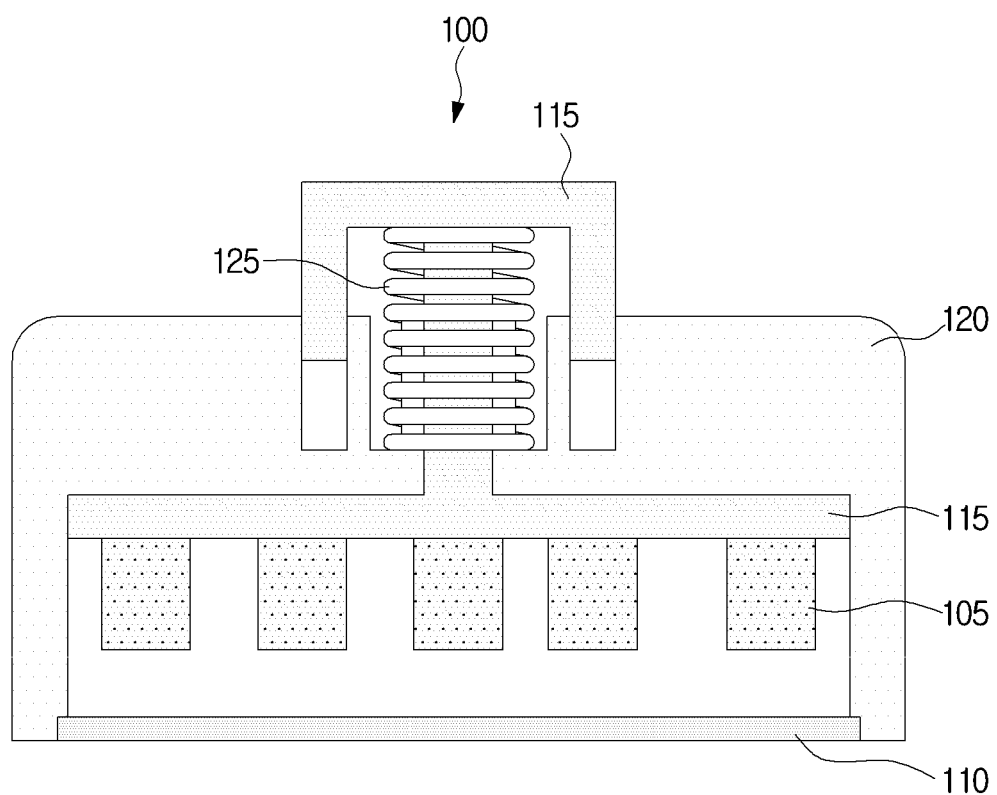

Referring to FIG. 7, the touch module 100 includes a housing unit 120 which fixes the touch film 110 and protects the touch units 105 disposed on and fixed to the frame unit 115. The touch film 110 is fixed to the housing unit 120, and the touch units 105 disposed on and fixed to the frame unit 115 are not visually exposed outside by the touch film 110 and the housing unit 120.

One side of the frame unit 115 protrudes outside of the housing unit 120 and receives electric capacitance of a human body which grasps the touch module 100 with a hand. Meanwhile, the frame unit 115 protruding outside of the housing unit 120 may be connected to a holder unit 130 which may be grasped by a hand of a human body, and the holder unit 130 may include a conductive material electrically connected to the frame unit 115.

Referring to FIG. 7, the touch module 100 includes a spring 125 which separates the touch units 105 disposed on and fixed to the frame unit 115 from the internal area 110b of the touch film 110 by a specified distance or more after the contact area 110a of the touch film 110 contacts the capacitive touch screen and before a pressure is applied. Meanwhile, the spring 125 may be omitted as an embodiment of FIG. 9.

Figure 8:
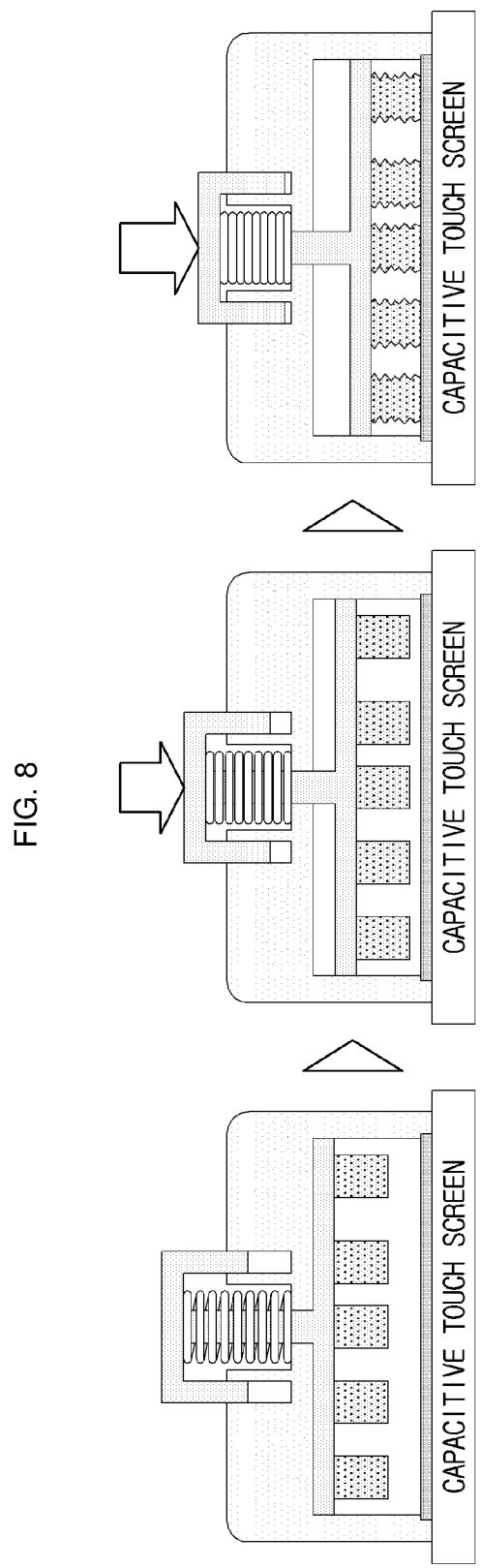
Figure 9:
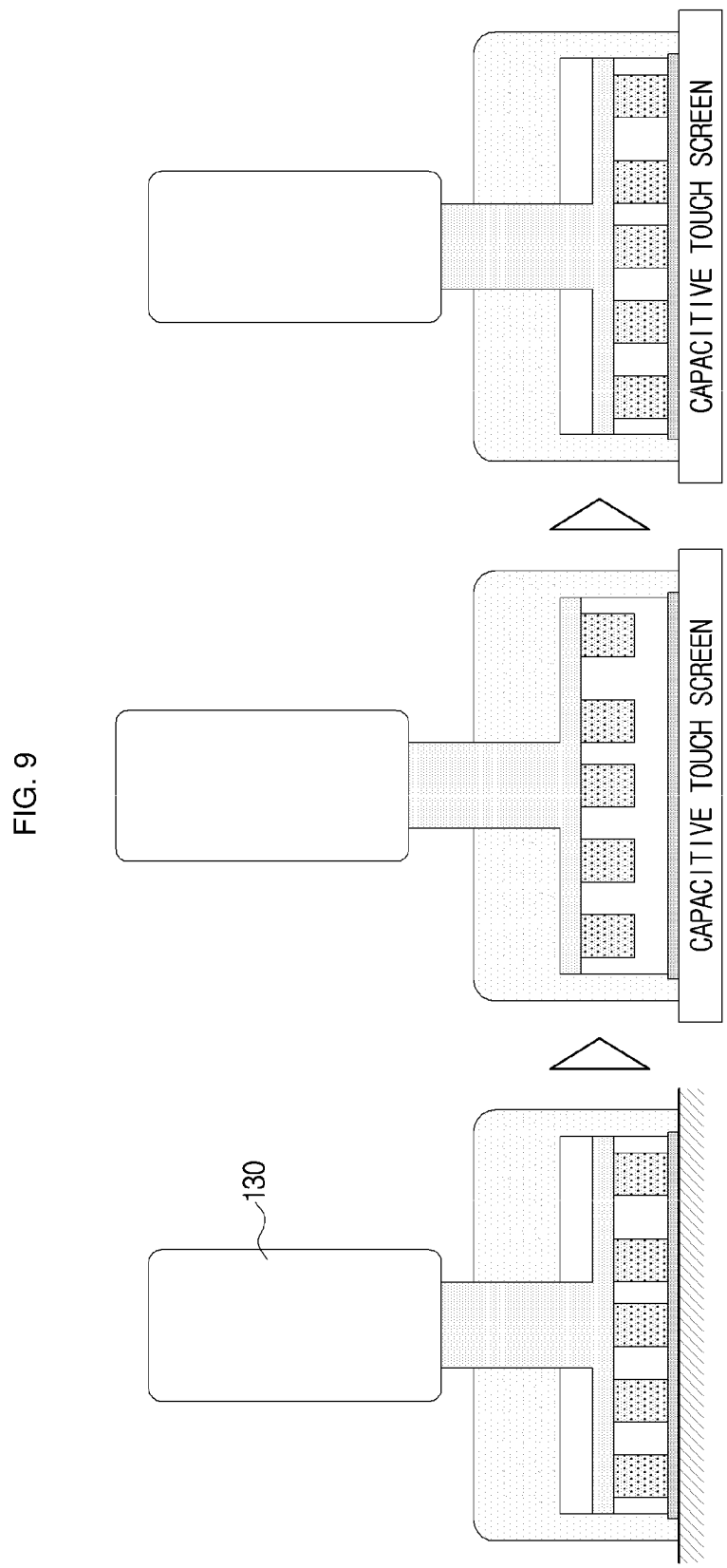

Referring to FIG. 8, in the state that the contact area 110a of the touch film 110 contacts the capacitive touch screen, when a pressure is applied, the touch units 105 disposed on and fixed to the frame unit 115 contact the internal area 110b of the touch film 110, at this time capacitance of the human body which applies the pressure is applied to the touch units 105 through the frame unit 115, and the plurality of touch units 105 disposed on and fixed to the frame unit 115 contacts the internal area 110b of the touch film 110 and touch the capacitive touch screen and are recognized in a predesigned unique geometric relation on design.

FIGS. 10 to 13 are diagrams illustrating a relation among touch units 105, a touch film 110, and a frame unit 115 included in a touch module 100 in accordance with a third embodiment of the present invention.

More specifically, FIGS. 10 to 13 illustrate embodiments in which a part of the plurality of touch units 105 each having the same height is disposed on and fixed to the internal area 110b of the touch film 110, and the rest touch units of the plurality of touch units 105 are disposed on and fixed to the frame unit 115.

Figure 10:
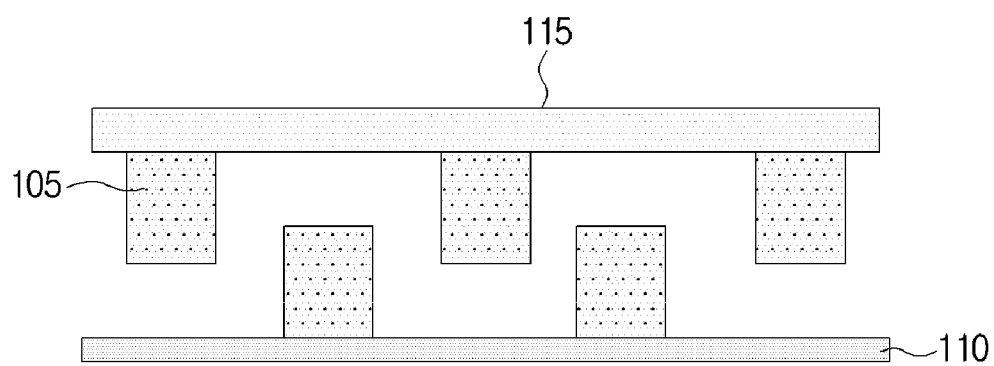
FIGS. 10 to 13 are diagrams illustrating a relation among touch units, a touch film, and a frame unit included in a touch module in accordance with a third embodiment of the present invention.

The touch module 100 of FIG. 10 includes the touch film 110 including the internal area 110b which disposes and fixes a part of the plurality of touch units 105 each having the same height, and the frame unit 115 which disposes and fixes the rest touch units 105 except the touch units 105 disposed on and fixed to the internal area 110b of the touch film 110, and a geometric relation in which a disposed position of the touch units 105 disposed on and fixed to the internal area 110b of the touch film 110 and a disposed position of the touch units 105 disposed on and fixed to the frame unit 115 are combined forms a predesigned unique geometric relation on design.

Referring to FIG. 10, the touch units 105 disposed on and fixed to the internal area 110b of the touch film 110 are separated from the frame unit 115 by a specified distance or more, and the touch units 105 disposed on and fixed to the frame unit 115 are separated from the internal area 110b of the touch film 110, after the contact area 110a of the touch film 110 contacts the capacitive touch screen and before a pressure is applied.

Figure 11:
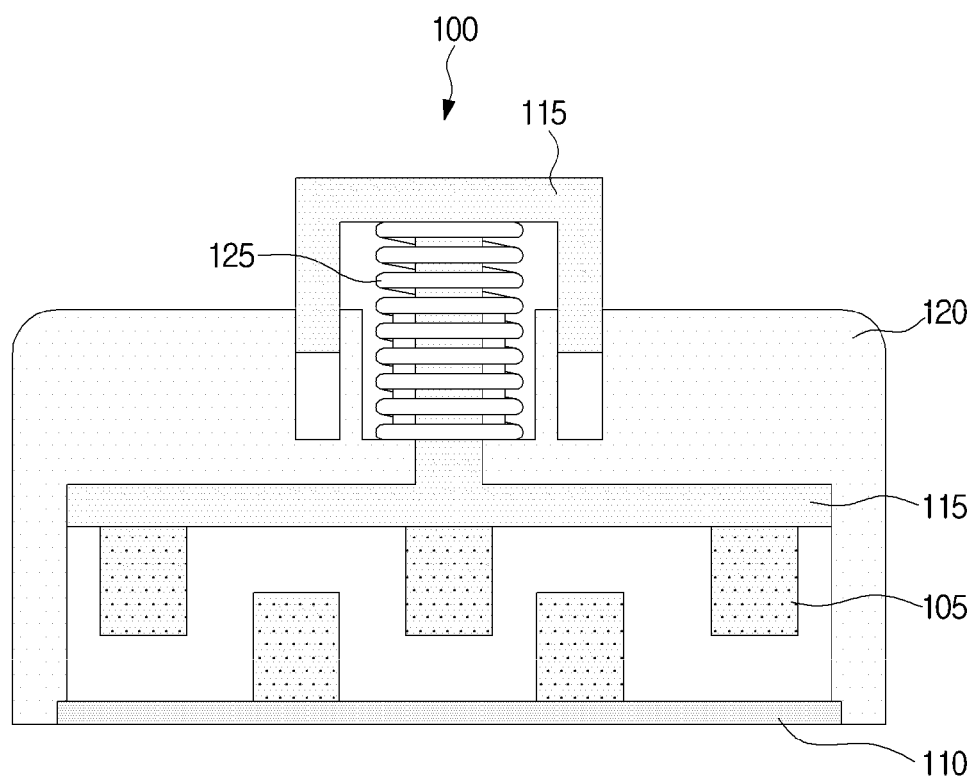

Referring to FIG. 11, the touch module 100 includes a housing unit 120 which fixes the touch film 110 and protects the touch units 105 dispersed and disposed on and fixed to the internal area 110b of the touch film 110 and the frame unit 115. The touch film 110 is fixed to the housing unit 120, and the touch units 105 dispersed and disposed on and fixed to the internal area 110b of the touch film 110 and the frame unit 115 are not visually exposed outside by the touch film 110 and the housing unit 120.

One side of the frame unit 115 protrude outside of the housing unit 120 and receives electric capacitance of a human body which grasps the touch module 100 with a hand. Meanwhile, the frame unit 115 protruding outside of the housing unit 120 may be connected to a holder unit 130 which may be grasped by a hand of a human body, and the holder unit 130 may include a conductive material electrically connected to the frame unit 115.

Referring to FIG. 11, the touch module 100 includes a spring 125 which separates the touch units 105 disposed on and fixed to the frame unit 115 from the internal area 110b of the touch film 110 by a specified distance or more after the contact area 110a of the touch film 110 contacts the capacitive touch screen and before a pressure is applied. Meanwhile, the spring 125 may be omitted as an embodiment of FIG. 13.

Figure 12:
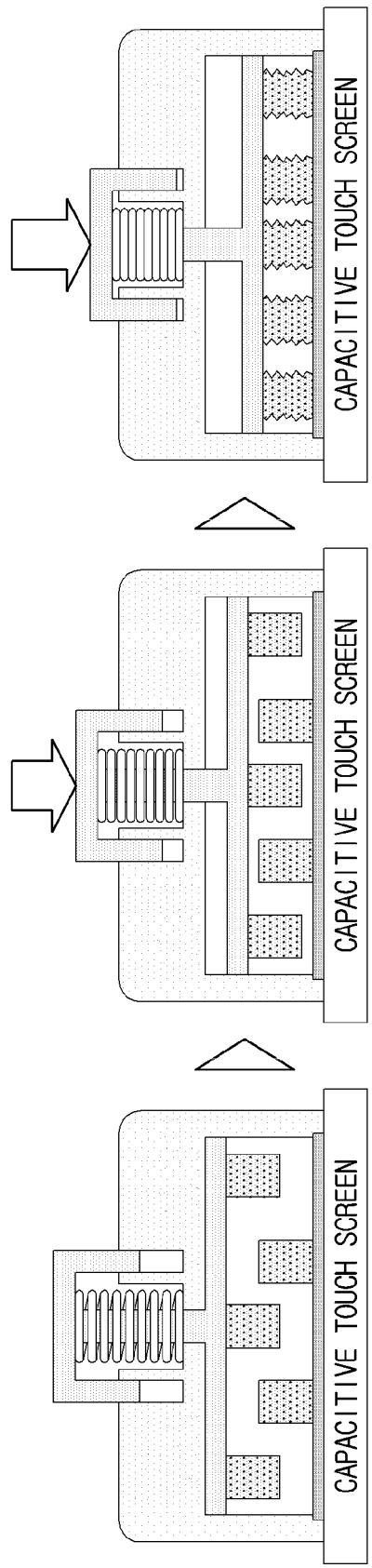
Figure 13:
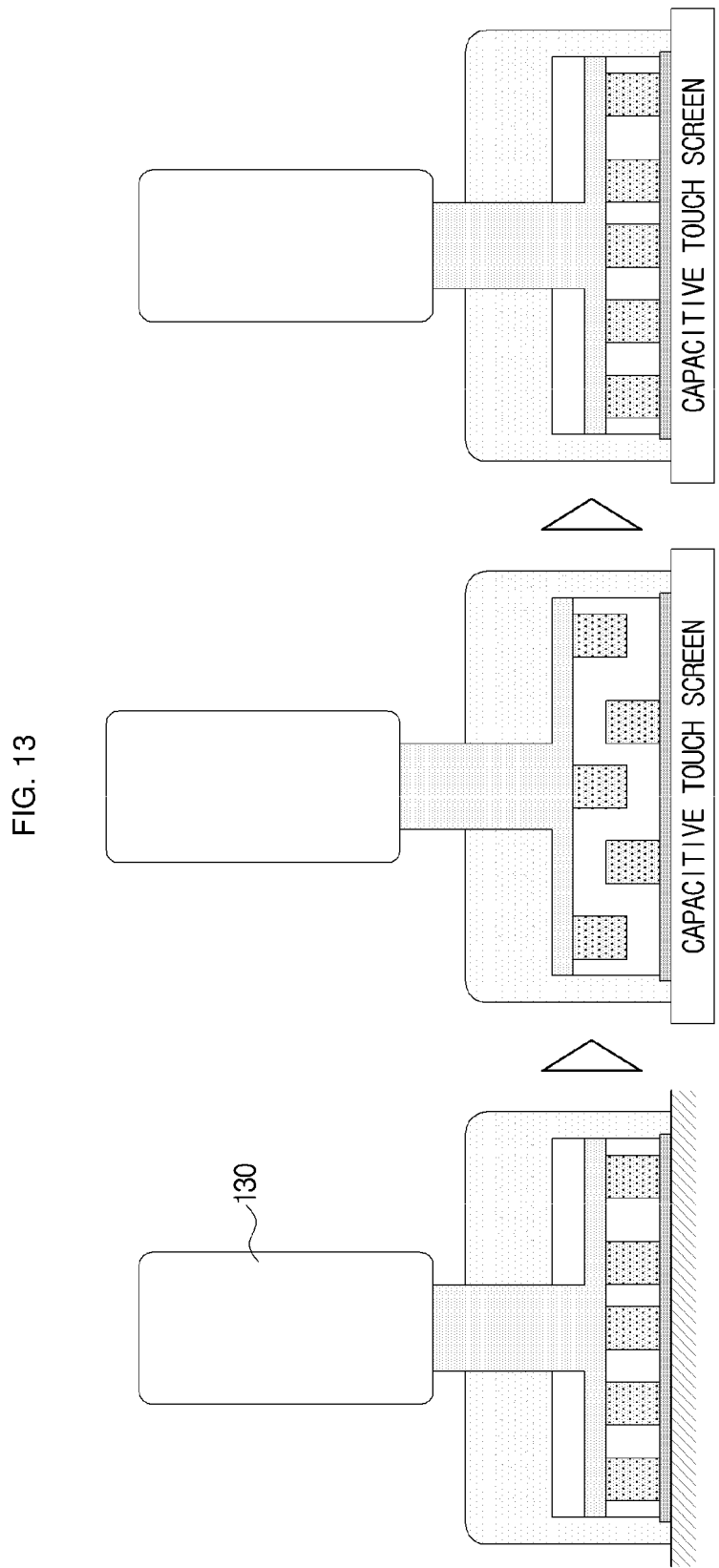

Referring to FIG. 12, in the state that the contact area 110a of the touch film 110 contacts the capacitive touch screen, when a pressure is applied, the touch units 105 disposed on and fixed to the internal area 110b of the touch film 110 contact the frame unit 115, and the touch units 105 disposed on and fixed to the frame unit 115 contact the internal area 110b of the touch film 110. At this time, capacitance of the human body which applies the pressure is applied to the touch units 105 through the frame unit 115, and the touch units 105 disposed on and fixed to the internal area 110b of the touch film 110 and the frame unit 115 touch the capacitive touch screen and are recognized in a predesigned unique geometric relation on design.

Figure 14:
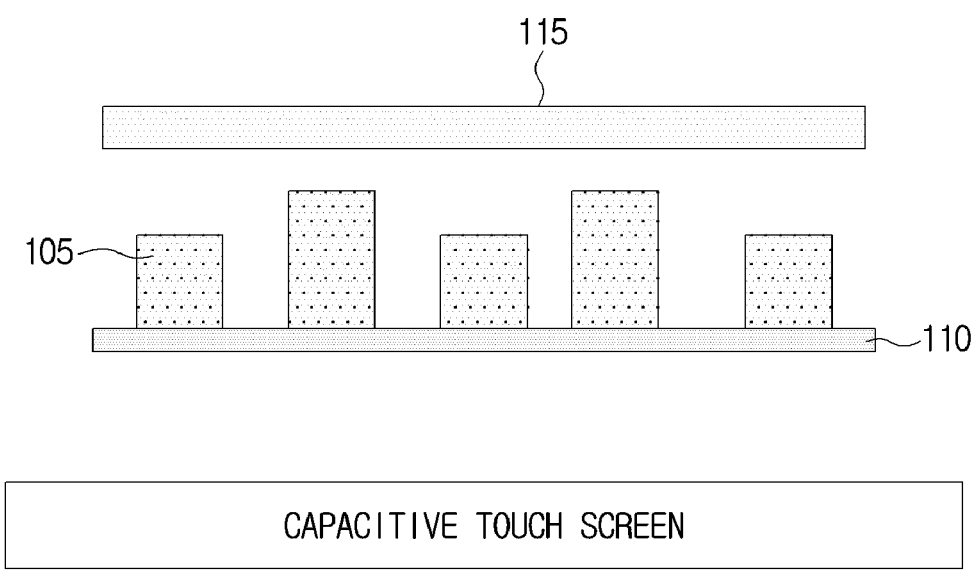
FIGS. 14 to 16 are diagrams illustrating a relation among touch units, a touch film, and a frame unit included in a touch module in accordance with a fourth embodiment of the present invention.
Figure 15:
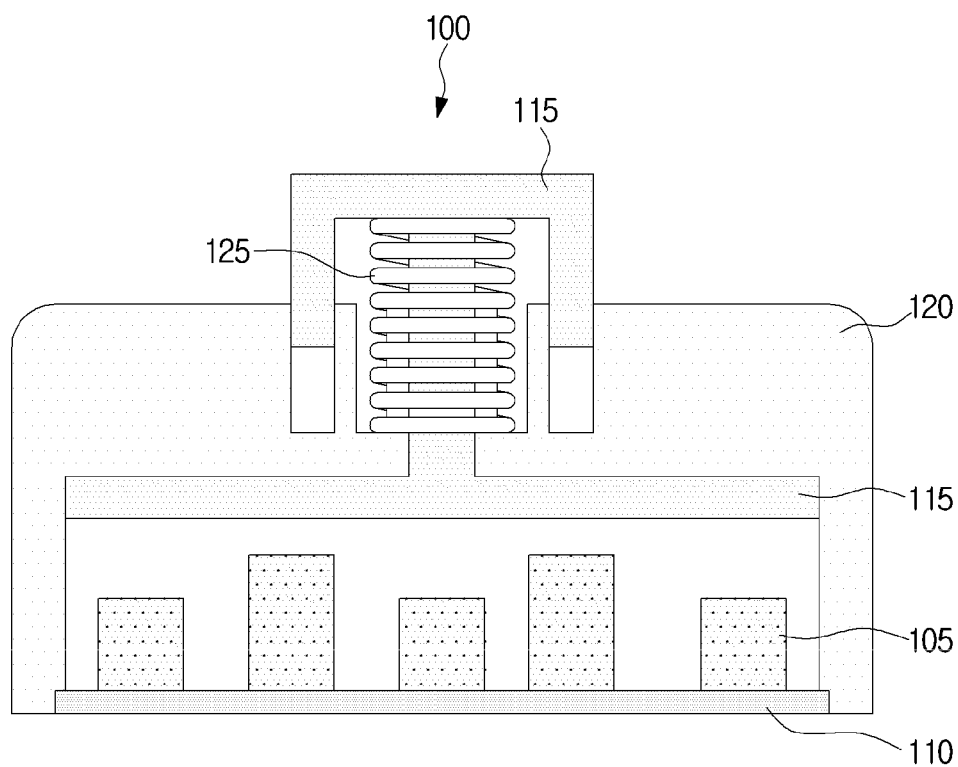
Figure 16:
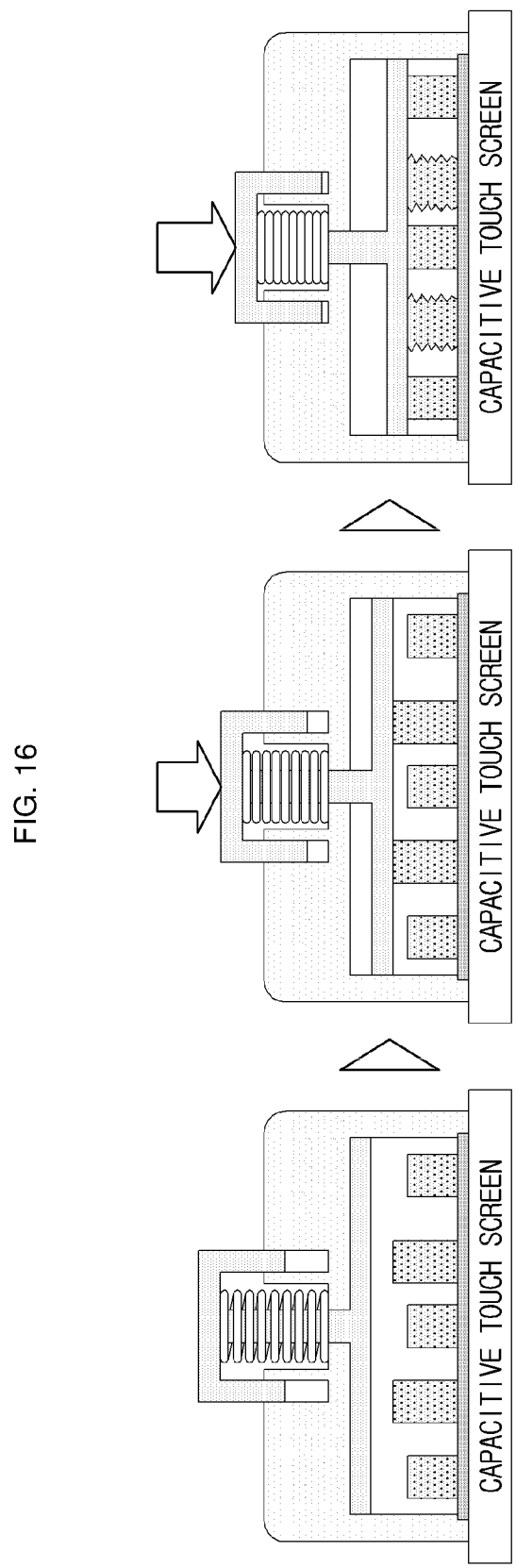

FIGS. 14 to 16 are diagrams illustrating a relation among touch units 105, a touch film 110, and a frame unit 115 included in a touch module 100 in accordance with a fourth embodiment of the present invention.

More specifically, FIGS. 14 to 16 illustrate embodiments in which the plurality of touch units 105 including at least one touch unit 105 having a height different from those of the other touch units 105 is disposed on and fixed to the internal area 110b of the touch film 110 in a predesigned unique geometric relation on design.

The touch module 100 of FIG. 14 includes the touch film 110 including the internal area 110b which disposes and fixes the plurality of touch units 105 including at least one touch unit 105 having a height different from those of the other touch units 105 in a predesigned unique geometric relation on design, and includes the frame unit 115 which is separated from the touch units 105 disposed on and fixed to the internal area 110b of the touch film 110 by a specified distance or more after the contact area 110a of the touch film 110 contacts the capacitive touch screen and before a pressure is applied.

Referring to FIG. 15, the touch module 100 includes a housing unit 120 which fixes the touch film 110 and protects the touch units 105 disposed on and fixed to the internal area 110b of the touch film 110. The touch film 110 is fixed to the housing unit 120, and the touch units 105 disposed on and fixed to the internal area 110b of the touch film 110 are not visually exposed outside by the touch film 110 and the housing unit 120.

The frame unit 115 having a facing surface capable of contacting the touch units 105 disposed on and fixed to the internal area 110b of the touch film 110 is provided inside of the housing unit 120. One side of the frame unit 115 protrudes outside of the housing unit 120 and receives electric capacitance of a human body which grasps the touch module 100 with a hand. Meanwhile, the frame unit 115 protruding outside of the housing unit 120 may be connected to a holder unit 130 which may be grasped by a hand of a human body, and the holder unit 130 may include a conductive material electrically connected to the frame unit 115.

Referring to FIG. 15, the touch module 100 includes a spring 125 which separates the touch units 105 disposed on and fixed to the internal area 110b of the touch film 110 from the frame unit 115 by a specified distance or more after the contact area 110a of the touch film 110 contacts the capacitive touch screen and before a pressure is applied.

Referring to FIG. 16, in the state that the contact area 110a of the touch film 110 contacts the capacitive touch screen, when a pressure is applied, the touch units 105 disposed on and fixed to the internal area 110b of the touch film 110 contact the frame unit 115 sequentially starting from a highest touch unit 105, at this time capacitance of the human body which applies the pressure is sequentially applied to the touch units 105 disposed on and fixed to the internal area 110b of the touch film 110 with different heights through the frame unit 115, and the plurality of touch units 105 disposed on and fixed to the internal area 110b of the touch film 110 touch the capacitive touch screen and are recognized in a predesigned unique geometric relation on design.

Figure 17:
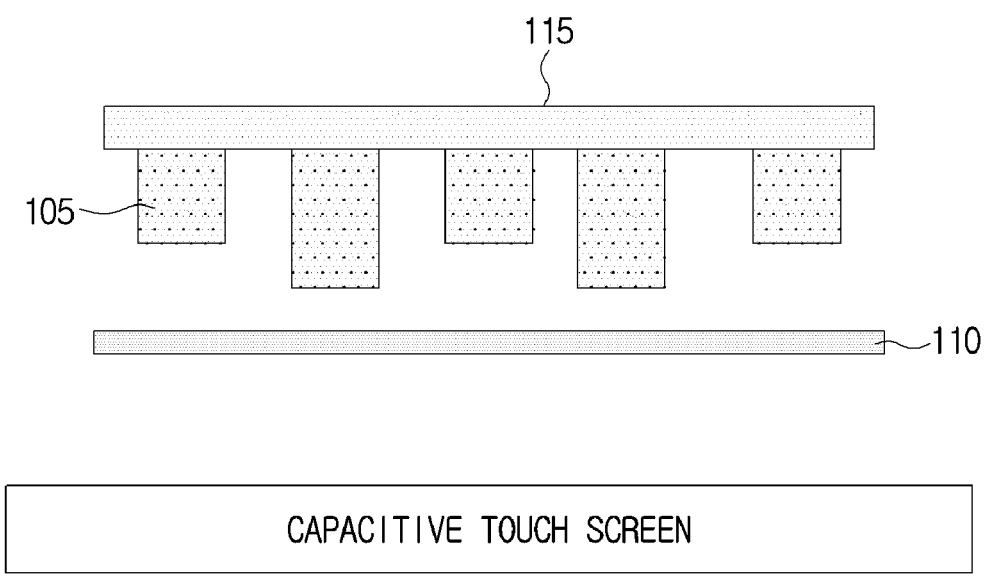
FIGS. 17 to 19 are diagrams illustrating a relation among touch units, a touch film, and a frame unit included in a touch module in accordance with a fifth embodiment of the present invention.
Figure 18:
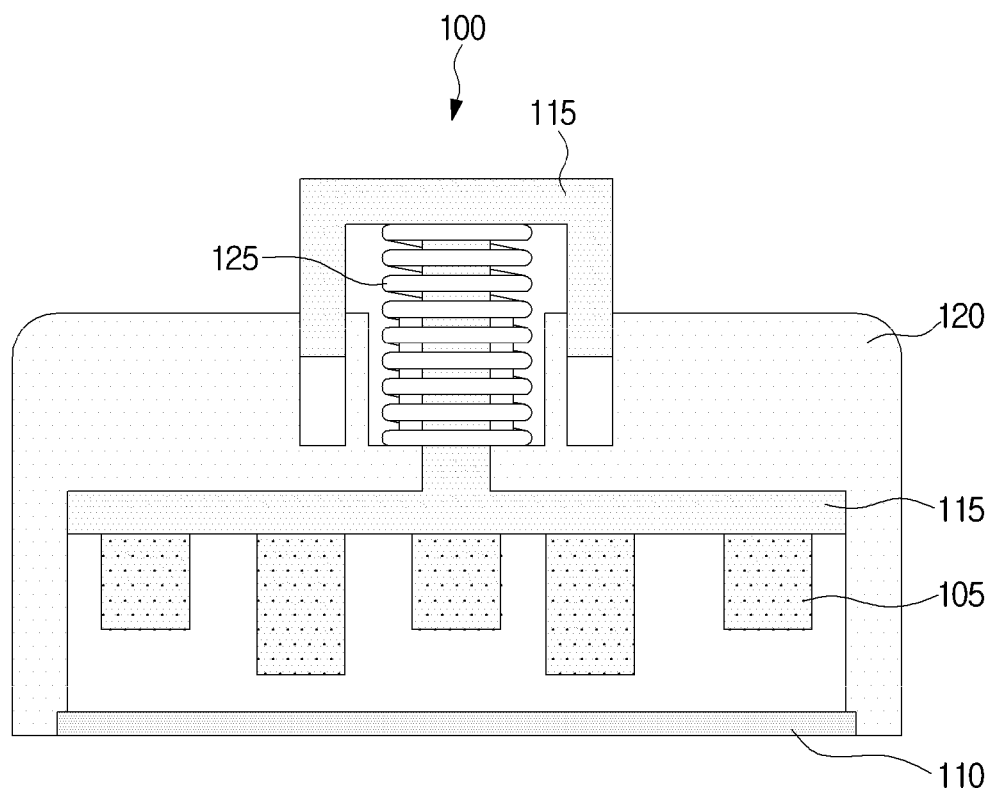
Figure 19:
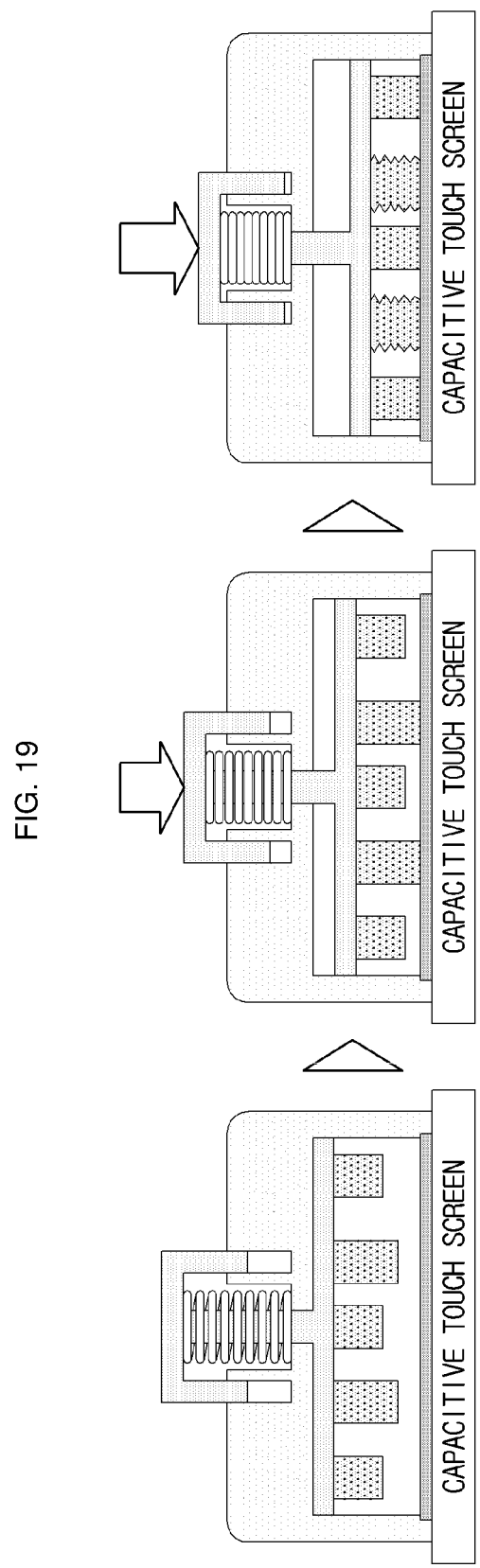

FIGS. 17 to 19 are diagrams illustrating a relation among touch units 105, a touch film 110, and a frame unit 115 included in a touch module 100 in accordance with a fifth embodiment of the present invention.

More specifically, FIGS. 17 to 19 illustrate embodiments in which the plurality of touch units 105 including at least one touch unit 105 having a height different from those of the other touch units 105 are disposed on and fixed to the frame unit 115 in a predesigned unique geometric relation on design.

The touch module 100 of FIG. 17 includes the frame unit 115 which dispose and fix the plurality of touch units 105 including at least one touch unit 105 having a height different from those of the other touch units 105 in a predesigned unique geometric relation on design, and includes the touch film 110 which is separated from the touch units 105 disposed on and fixed to the frame unit 115 by a specified distance or more after the contact area 110a of the touch film 110 contacts the capacitive touch screen and before a pressure is applied.

Referring to FIG. 18, the touch module 100 includes a housing unit 120 which fixes the touch film 110 and protects the touch units 105 disposed on and fixed to the frame unit 115. The touch film 110 is fixed to the housing unit 120, and the touch units 105 disposed on and fixed to the frame unit 115 are not visually exposed outside by the touch film 110 and the housing unit 120.

One side of the frame unit 115 protrudes outside of the housing unit 120 and receives electric capacitance of a human body which grasps the touch module 100 with a hand. Meanwhile, the frame unit 115 protruding outside of the housing unit 120 may be connected to a holder unit 130 which may be grasped by a hand of a human body, and the holder unit 130 may include a conductive material electrically connected to the frame unit 115.

Referring to FIG. 18, the touch module 100 includes a spring 125 which separates the touch units 105 disposed on and fixed to the frame unit 115 from the internal area 110b of the touch film 110 by a specified distance or more after the contact area 110a of the touch film 110 contacts the capacitive touch screen and before a pressure is applied.

Referring to FIG. 19, in the state that the contact area 110a of the touch film 110 contacts to the capacitive touch screen, when a pressure is applied, the touch units 105 disposed on and fixed to the frame unit 115 contact the internal area 110b of the touch film 110 sequentially starting from a highest touch unit 105, at this time capacitance of the human body which applies the pressure is applied to the touch units 105, and the plurality of touch units 105 disposed on and fixed to the frame unit 115 sequentially contact the internal area 110b of the touch film 110 and sequentially touch the capacitive touch screen and are recognized in a predesigned unique geometric relation on design.

Figure 20:
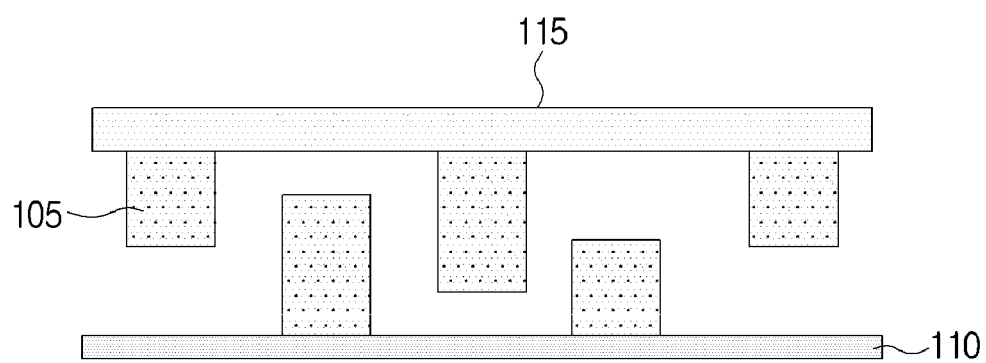
FIGS. 20 to 22 are diagrams illustrating a relation among touch units, a touch film, and a frame unit included in a touch module in accordance with a sixth embodiment of the present invention.
Figure 21:
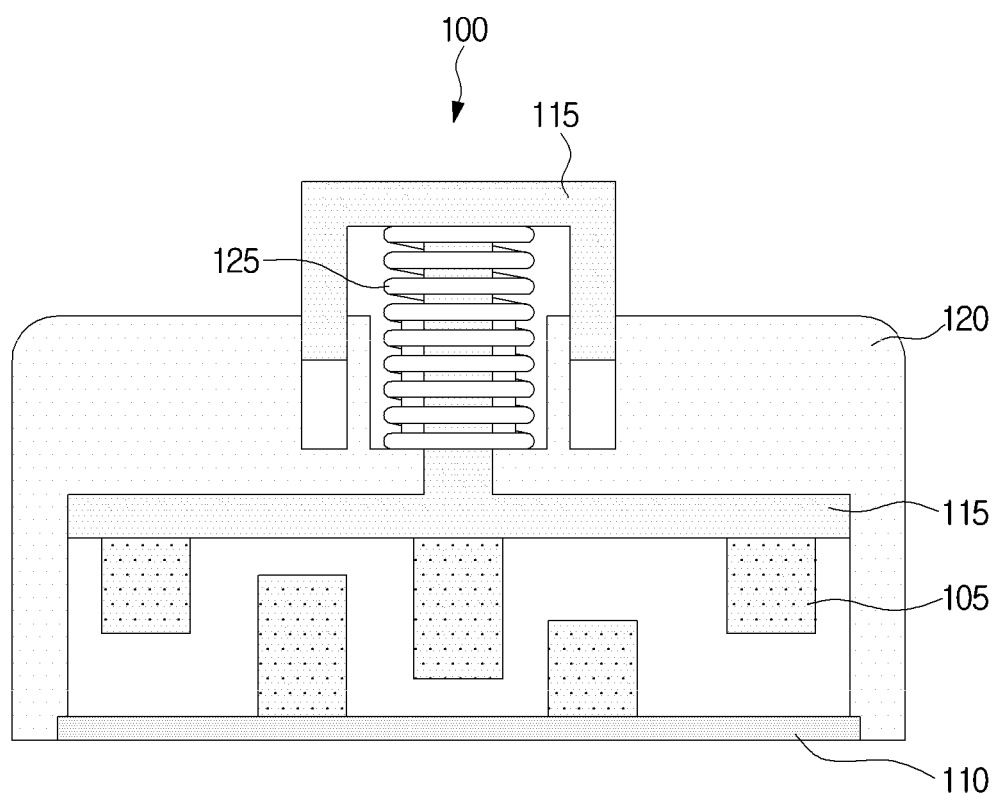
Figure 22:
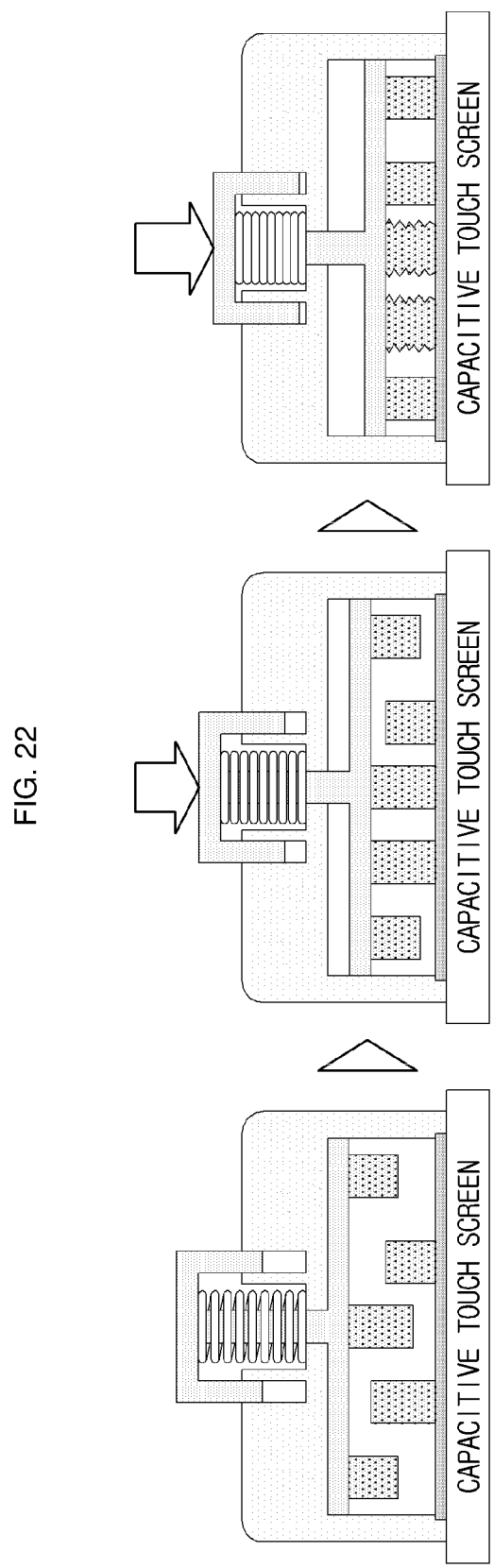

FIGS. 20 to 22 are diagrams illustrating a relation among touch units 105, a touch film 110, and a frame unit 115 included in a touch module 100 in accordance with a sixth embodiment of the present invention.

More specifically, FIGS. 20 to 22 illustrate embodiments in which a part of the plurality of touch units 105 including at least one touch unit 105 having a height different from those of the other touch units 105 is disposed on and fixed to the internal area 110b of the touch film 110, and the rest touch units of the plurality of touch units 105 are disposed on and fixed to the frame unit 115.

The touch module 100 of FIG. 20 includes the touch film 110 including the internal area 110b which disposes and fixes a part of the plurality of touch units 105 including at least one touch unit 105 having a height different from those of the other touch units 105, and the frame unit 115 which disposes and fixes the rest touch units 105 except the touch units 105 disposed on and fixed to the internal area 110b of the touch film 110, and a geometric relation in which a disposed position of the touch units 105 disposed on and fixed to the internal area 110b of the touch film 110 and a disposed position of the touch units 105 disposed on and fixed to the frame unit 115 are combined forms a predesigned unique geometric relation on design.

Referring to FIG. 20, the touch units 105 disposed on and fixed to the internal area 110b of the touch film 110 are separated from the frame unit 115 by a specified distance or more, and the touch units 105 disposed on and fixed to the frame unit 115 are separated from the internal area 110b of the touch film 110, after the contact area 110a of the touch film 110 contacts the capacitive touch screen and before a pressure is applied.

Referring to FIG. 21, the touch module 100 includes a housing unit 120 which fixes the touch film 110 and protects the touch units 105 dispersed and disposed on and fixed to the internal area 110b of the touch film 110 and the frame unit 115. The touch film 110 is fixed to the housing unit 120, and the touch units 105 dispersed and disposed on and fixed to the internal area 110b of the touch film 110 and the frame unit 115 are not visually exposed outside by the touch film 110 and the housing unit 120.

One side of the frame unit 115 protrudes outside of the housing unit 120 and receives electric capacitance of a human body which grasps the touch module 100 with a hand. Meanwhile, the frame unit 115 protruding outside of the housing unit 120 may be connected to a holder unit 130 which may be grasped by a hand of a human body, and the holder unit 130 may include a conductive material electrically connected to the frame unit 115.

Referring to FIG. 21, the touch module 100 includes a spring 125 which separates the touch units 105 disposed on and fixed to the frame unit 115 from the internal area 110b of the touch film 110 by a specified distance or more after the contact area 110a of the touch film 110 contacts the capacitive touch screen and before a pressure is applied.

Referring to FIG. 22, in the state that the contact area 110a of the touch film 110 contacts the capacitive touch screen, when a pressure is applied, the touch units 105 disposed on and fixed to the internal area 110b of the touch film 110 contact the frame unit 115 sequentially starting from a highest touch unit 105, and the touch units 105 disposed on and fixed to the frame unit 115 contact the internal area 110b of the touch film 110 sequentially starting from a highest touch unit 105. When the highest touch unit 105 of the plurality of touch units 105 is disposed on and fixed to the internal area 110b of the touch film 110, the plurality of touch units 105 contact the frame unit 115 starting from a highest touch unit 105 by the pressure. Further, when the highest touch unit 105 of the plurality of touch units 105 is disposed on and fixed to the frame unit 115, the plurality of touch units 105 contact the internal area 110b of the touch film 110 starting from a highest touch unit 105 by the pressure. At this time, capacitance of the human body which applies the pressure is first applied to the touch units 105 disposed on and fixed to the frame unit 115, and then applies to the touch units disposed on and fixed to the internal area 110b of the touch film 110 as the touch units 105 disposed on and fixed to the internal area 110b of the touch film 110 contact the frame unit 115. According to an order in which the touch units 105 disposed on and fixed to the internal area 110b of the touch film 110 contact the frame unit 115 and an order in which the touch units 105 disposed on and fixed to the frame unit 115 contact the internal area 110b of the touch film 110, the touch units 105 dispersed and disposed on and fixed to the internal area 110b of the touch film 110 and the frame unit 115 with different heights sequentially touch the capacitive touch screen and are recognized in a predesigned unique geometric relation on design.

Figure 23:
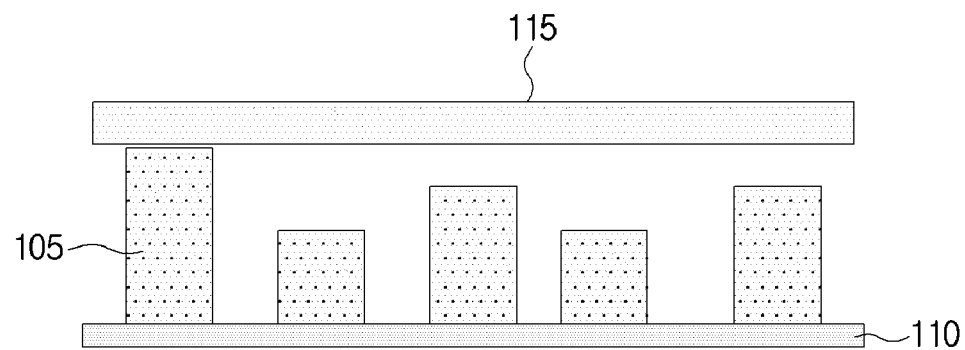
FIGS. 23 to 25 are diagrams illustrating a relation among touch units, a touch film, and a frame unit included in a touch module in accordance with a seventh embodiment of the present invention.
Figure 24:
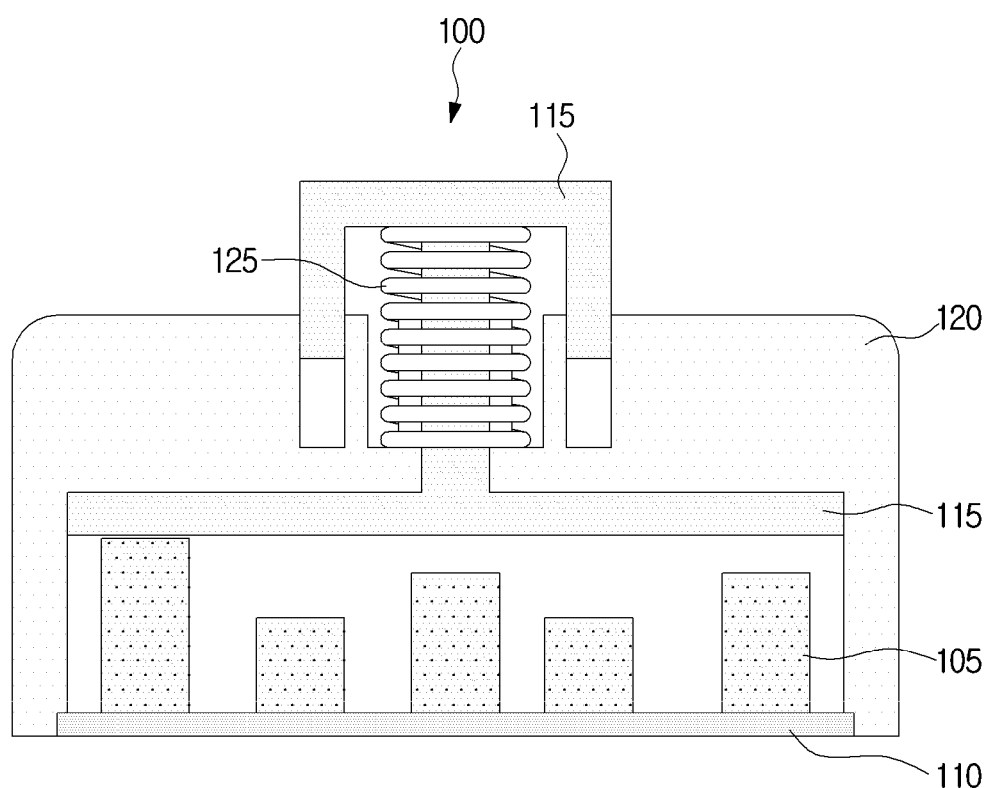
Figure 25:
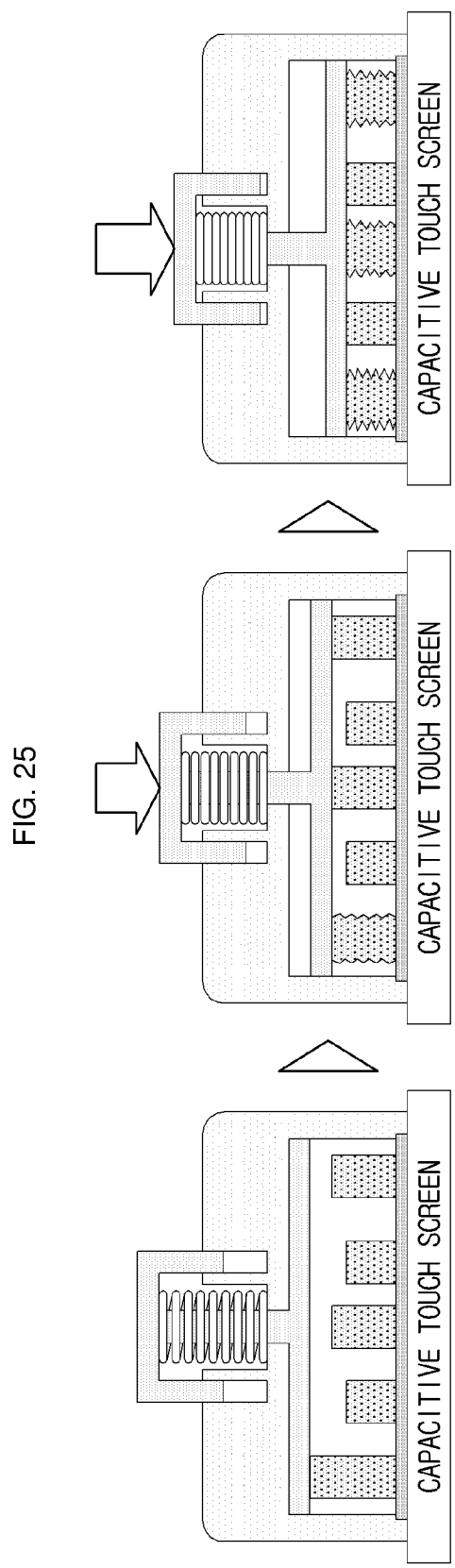

FIGS. 23 to 25 are diagrams illustrating a relation among touch units 105, a touch film 110, and a frame unit 115 included in a touch module 100 in accordance with a seventh embodiment of the present invention.

More specifically, FIGS. 23 to 25 illustrate embodiments in which the plurality of touch units 105 including at least one touch unit 105 having a height different from those of the other touch units 105 are disposed on and fixed to the internal area 110b of the touch film 110 in a predesigned unique geometric relation on design.

The touch module 100 of FIG. 23 includes the touch film 110 including the internal area 110b which disposes and fixes the plurality of touch units 105 including at least one touch unit 105 having a height different from those of the other touch units 105 in a predesigned unique geometric relation on design, and includes the frame unit 115 which maintains a contacted state with a highest touch unit 105 among the touch units 105 disposed on and fixed to the internal area 110b of the touch film 110.

Referring to FIG. 24, the touch module 100 includes a housing unit 120 which fixes the touch film 110 and protects the touch units 105 disposed on and fixed to the internal area 110b of the touch film 110. The touch film 110 is fixed to the housing unit 120, and the touch units 105 disposed on and fixed to the internal area 110b of the touch film 110 are not visually exposed outside by the touch film 110 and the housing unit 120.

The frame unit 115 having a facing surface capable of contacting the touch units 105 disposed on and fixed to the internal area 110b of the touch film 110 is provided inside of the housing unit 120. One side of the frame unit 115 protrudes outside of the housing unit 120 and receives electric capacitance of a human body which grasps the touch module 100 with a hand. Meanwhile, the frame unit 115 protruding outside of the housing unit 120 may be connected to a holder unit 130 which may be grasped by a hand of a human body, and the holder unit 130 may include a conductive material electrically connected to the frame unit 115.

Referring to FIG. 25, in the state that the contact area 110a of the touch film 110 contacts the capacitive touch screen, when a pressure is applied, the touch units 105 disposed on and fixed to the internal area 110b of the touch film 110 contact the frame unit 115 sequentially based on respective heights, at this time capacitance of the human body which applies the pressure is sequentially applied to respective touch units 105 disposed on and fixed to the internal area 110b of the touch film 110 with different heights through the frame unit 115, and the plurality of touch units 105 disposed on and fixed to the internal area 110b of the touch film 110 touch the capacitive touch screen and are recognized in a predesigned unique geometric relation on design.

Figure 26:
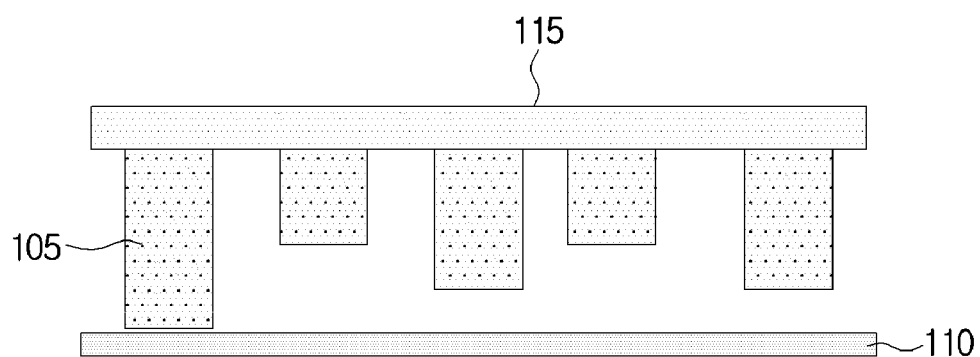
FIGS. 26 to 28 are diagrams illustrating a relation among touch units, a touch film, and a frame unit included in a touch module in accordance with a eighth embodiment of the present invention.
Figure 27:
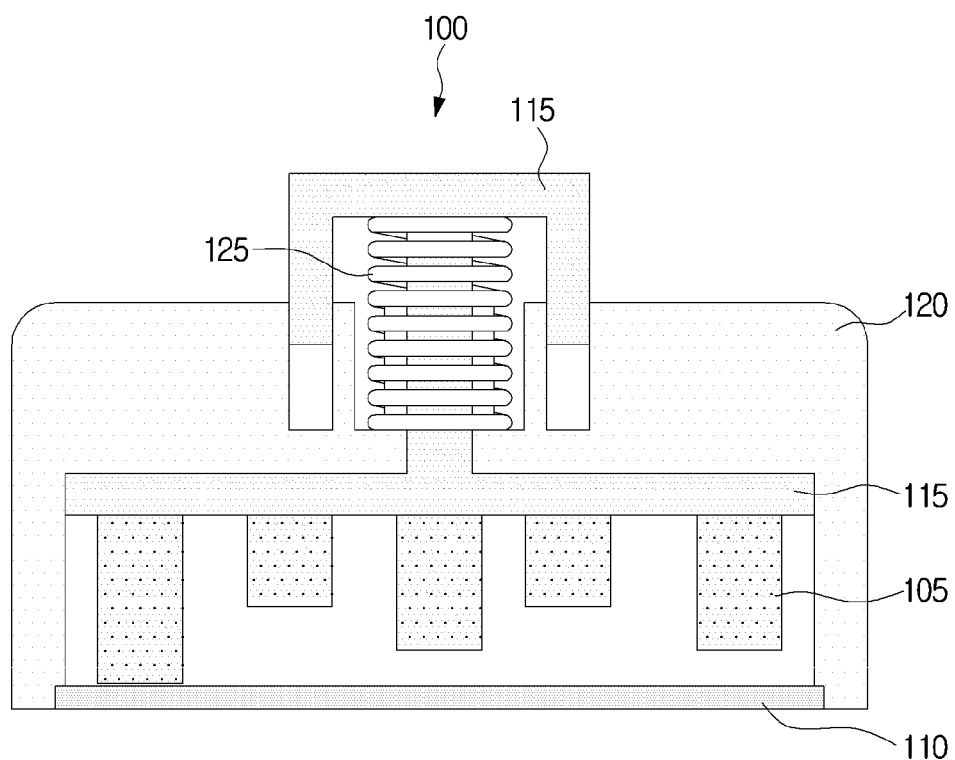
Figure 28:
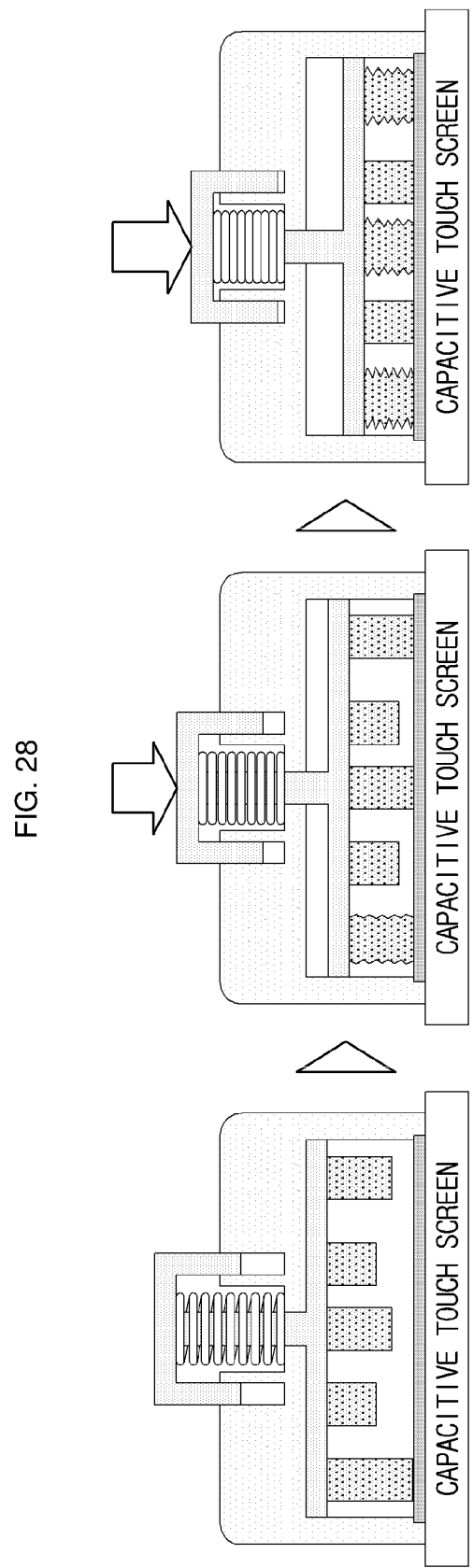

FIGS. 26 to 28 are diagrams illustrating a relation among touch units 105, a touch film 110, and a frame unit 115 included in a touch module 100 in accordance with a eighth embodiment of the present invention.

More specifically, FIGS. 26 to 28 illustrate embodiments in which the plurality of touch units 105 including at least one touch unit 105 having a height different from those of the other touch units 105 are disposed on and fixed to the frame unit 115 in a predesigned unique geometric relation on design.

The touch module 100 of FIG. 26 includes the frame unit 115 which disposes and fixes the plurality of touch units 105 including at least one touch unit 105 having a height different from those of the other touch units 105 in a predesigned unique geometric relation on design, and includes the touch film 110 which maintains a contacted state with a highest touch unit 105 among the touch units 105 disposed on and fixed to the frame unit 115.

Referring to FIG. 27, the touch module 100 includes a housing unit 120 which fixes the touch film 110 and protects the touch units 105 disposed on and fixed to the frame unit 115. The touch film 110 is fixed to the housing unit 120, and the touch units 105 disposed on and fixed to the frame unit 115 are not visually exposed outside by the touch film 110 and the housing unit 120.

One side of the frame unit 115 protrudes outside of the housing unit 120 and receives electric capacitance of a human body which grasps the touch module 100 with a hand. Meanwhile, the frame unit 115 protruding outside of the housing unit 120 may be connected to a holder unit 130 which may be grasped by a hand of a human body, and the holder unit 130 may include a conductive material electrically connected to the frame unit 115.

Referring to FIG. 28, in the state that the contact area 110a of the touch film 110 contacts the capacitive touch screen, when a pressure is applied, the touch units 105 disposed on and fixed to the frame unit 115 contact the internal area 110b of the touch film 110 sequentially based on respective heights, at this time capacitance of the human body which applies the pressure is sequentially applied to respective touch units 105 through the frame unit 115, and the plurality of touch units 105 disposed on and fixed to the frame unit 115 sequentially contacts the internal area 110b of the touch film 110 and touch the capacitive touch screen and are recognized in a predesigned unique geometric relation on design.

Figure 29:
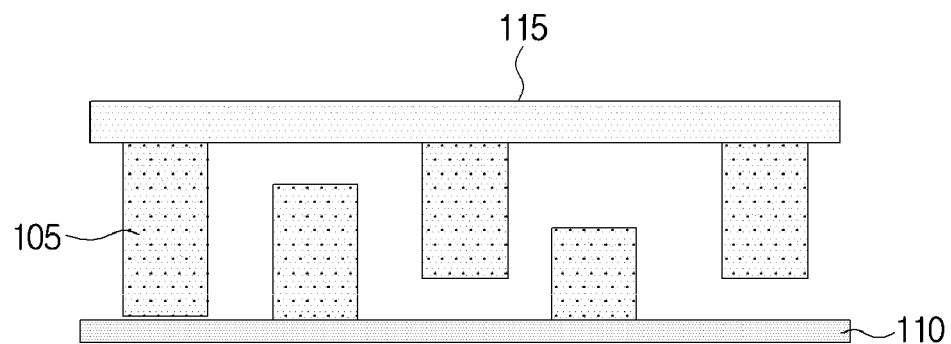
FIGS. 29 to 31 are diagrams illustrating a relation among touch units, a touch film, and a frame unit included in a touch module in accordance with a ninth embodiment of the present invention.
Figure 30:
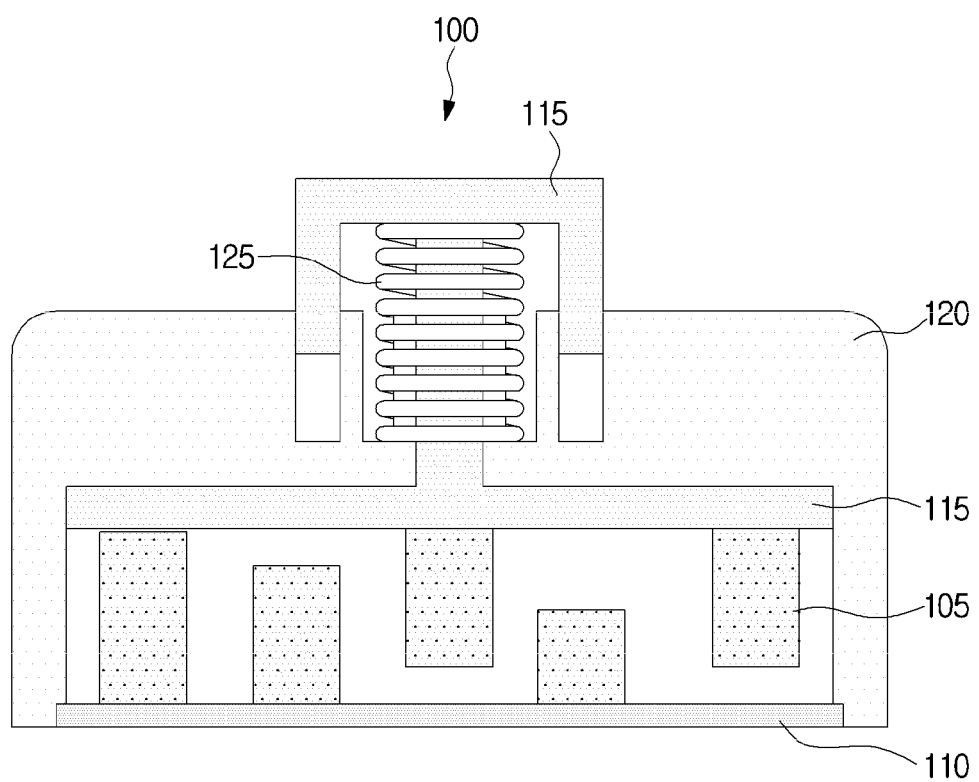
Figure 31:
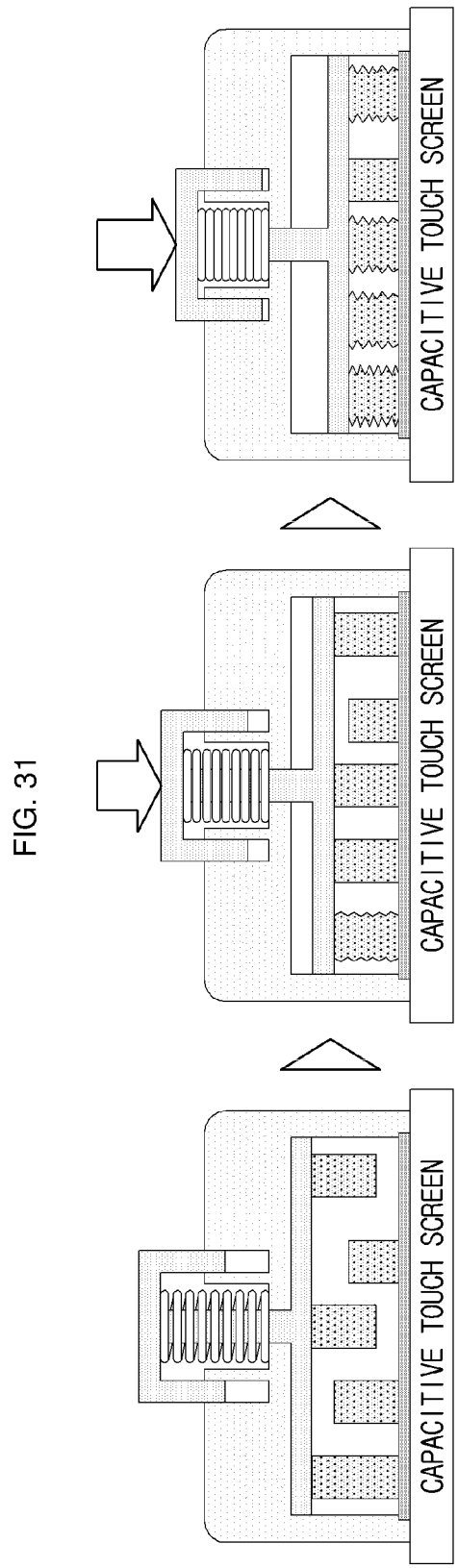

FIGS. 29 to 31 are diagrams illustrating a relation among touch units 105, a touch film 110, and a frame unit 115 included in a touch module 100 in accordance with a ninth embodiment of the present invention.

More specifically, FIGS. 29 to 31 illustrate embodiments in which a part of the plurality of touch units 105 including at least one touch unit of the housing unit 120 the other touch units 105 is disposed on and fixed to the internal area 110b of the touch film 110, and the rest touch units of the plurality of touch units 105 are disposed on and fixed to the frame unit 115.

The touch module 100 of FIG. 29 includes the touch film 110 including the internal area 110b which dispose and fix a part of the plurality of touch units 105 including at least one touch unit of the housing unit 120 the other touch units 105, and the frame unit 115 which disposes and fixes the rest touch units 105 except the touch units 105 disposed on and fixed to the internal area 110b of the touch film 110, and a geometric relation in which a disposed position of the touch units 105 disposed on and fixed to the internal area 110b of the touch film 110 and a disposed position of the touch units 105 disposed on and fixed to the frame unit 115 are combined forms a predesigned unique geometric relation on design.

Referring to FIG. 29, the frame unit 115 disposes and fixes a highest touch unit 105 among the plurality of touch units 105, and the highest touch unit 105 disposed on and fixed to the frame unit 115 maintains a contacted state with the internal area 110b of the touch film 110.

Referring to FIG. 30, the touch module 100 includes a housing unit 120 which fixes the touch film 110 and protects the touch units 105 dispersed and disposed on and fixed to the internal area 110b of the touch film 110 and the frame unit 115. The touch film 110 is fixed to the housing unit 120, and the touch units 105 dispersed and disposed on and fixed to the internal area 110b of the touch film 110 and the frame unit 115 are not visually exposed outside by the touch film 110 and the housing unit 120.

One side of the frame unit 115 protrudes outside of the housing unit 120 and receives electric capacitance of a human body which grasps the touch module 100 with a hand. Meanwhile, the frame unit 115 protruding outside of the housing unit 120 may be connected to a holder unit 130 which may be grasped by a hand of a human body, and the holder unit 130 may include a conductive material electrically connected to the frame unit 115.

Referring to FIG. 31, in the state that the contact area 110a of the touch film 110 contacts the capacitive touch screen, when a pressure is applied, the touch units 105 disposed on and fixed to the internal area 110b of the touch film 110 contact the frame unit 115 sequentially starting from the highest touch unit 105, and the touch units 105 disposed on and fixed to the frame unit 115 contact the internal area 110b of the touch film 110 sequentially starting from the highest touch unit 105. At this time, capacitance of the human body which applies the pressure is first applied to the highest touch unit 105 of the touch units 105 disposed on and fixed to the frame unit 115 and the internal area 110b of the touch film 110, and also applied to the touch units 105 disposed on and fixed to the internal area 110b of the touch film 110 as the touch units 105 disposed on and fixed to the internal area 110b of the touch film 110 contact the frame unit 115.

Referring to FIG. 31, the highest touch unit 105 disposed on and fixed to the frame unit 115 of the touch units 105 dispersed and disposed on and fixed to the internal area 110b of the touch film 110 and the frame unit 115 with different heights is first touched and recognized, and the rest touch units 105 are sequentially touched on the capacitive touch screen and recognized according to a predesigned unique geometric relation on design based on an order in which the touch units 105 disposed on and fixed to the internal area 110b of the touch film 110 contact the frame unit 115 and an order in which the touch units 105 disposed on and fixed to the frame unit 115 contact the internal area 110b of the touch film 110 by the pressure.

Figure 32:
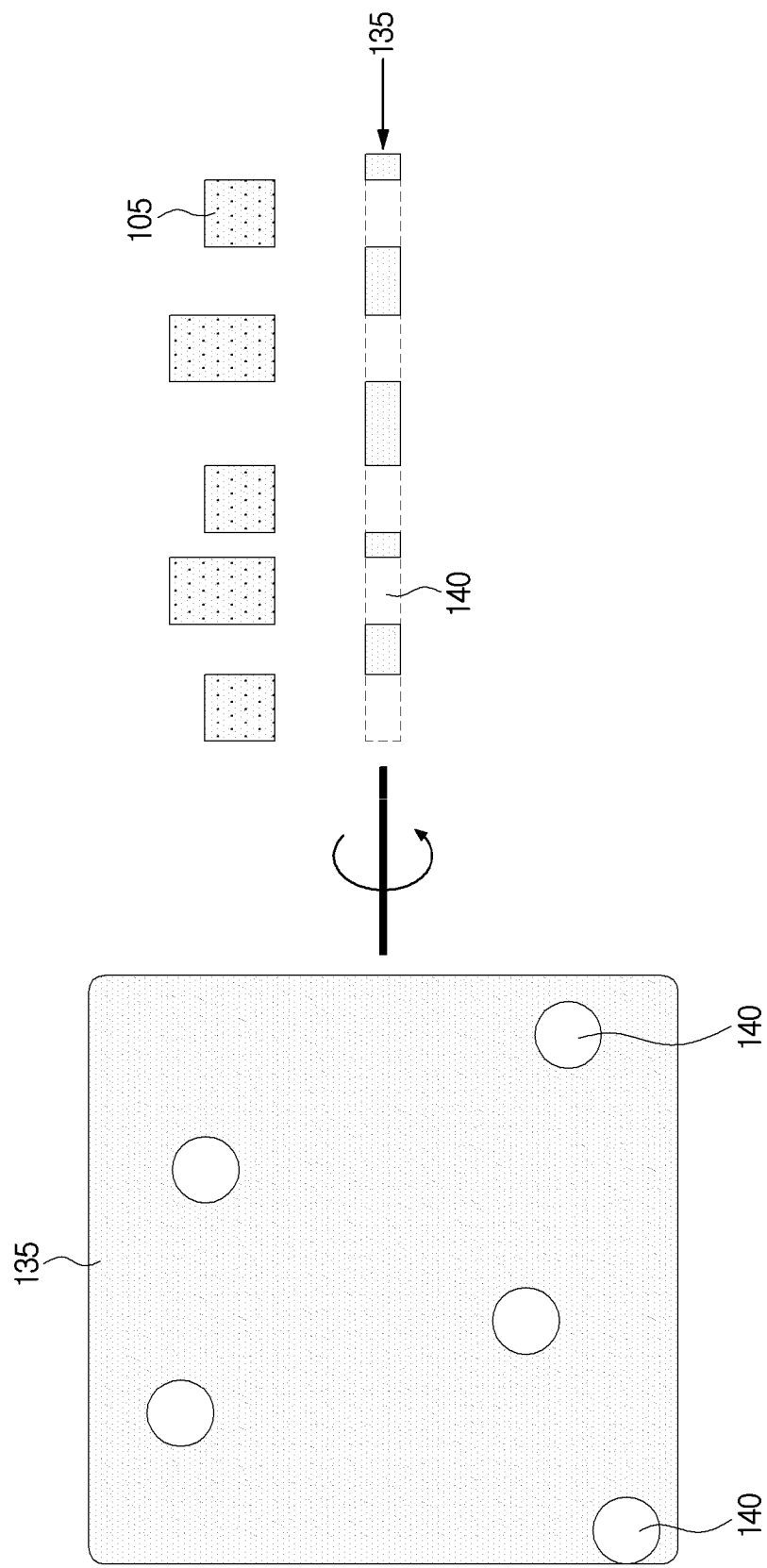
FIGS. 32 to 34 are diagrams illustrating a relation among touch units, a touch film, and a frame unit included in a touch module in accordance with a tenth embodiment of the present invention.
Figure 33:
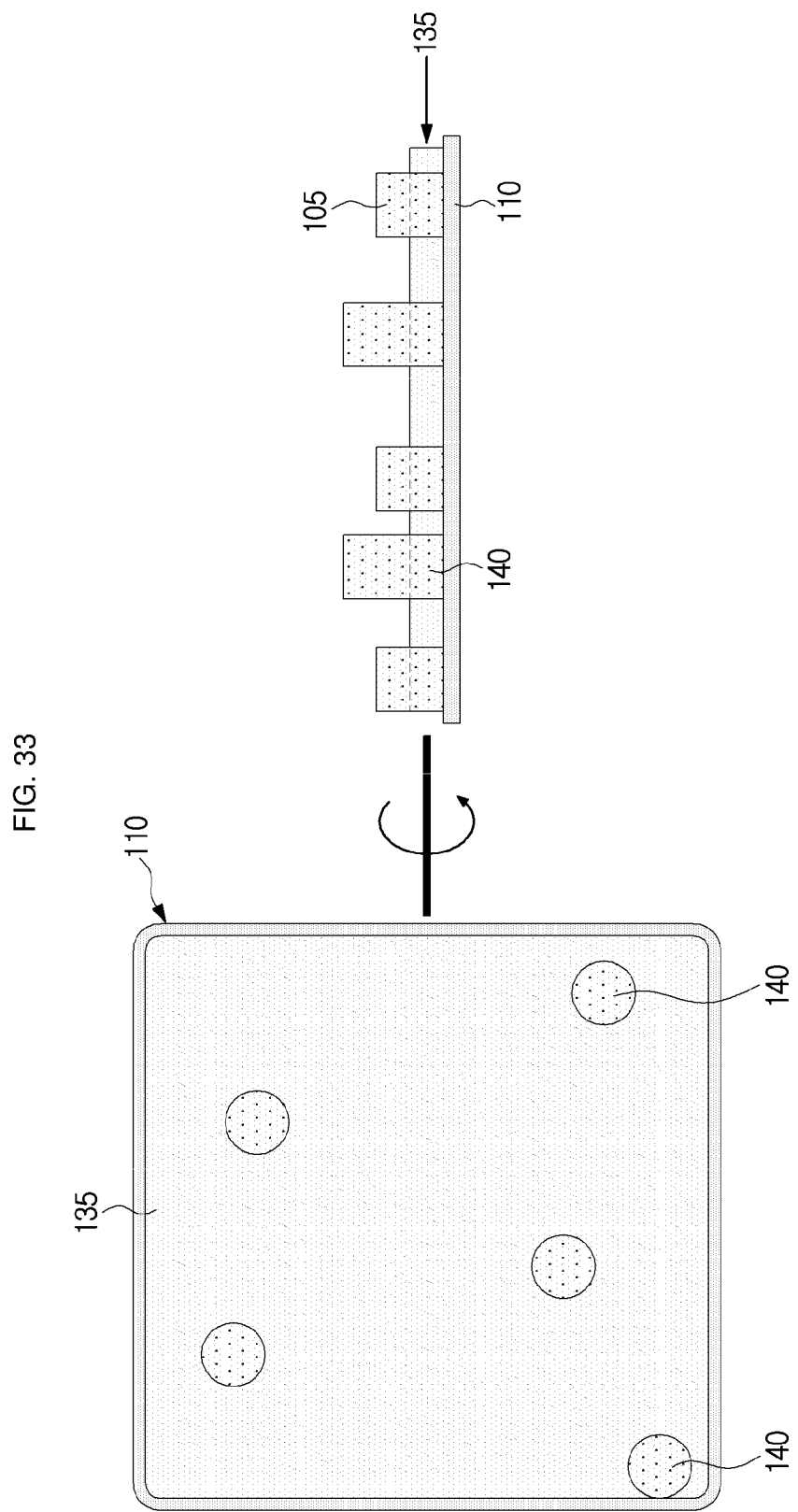
Figure 34:
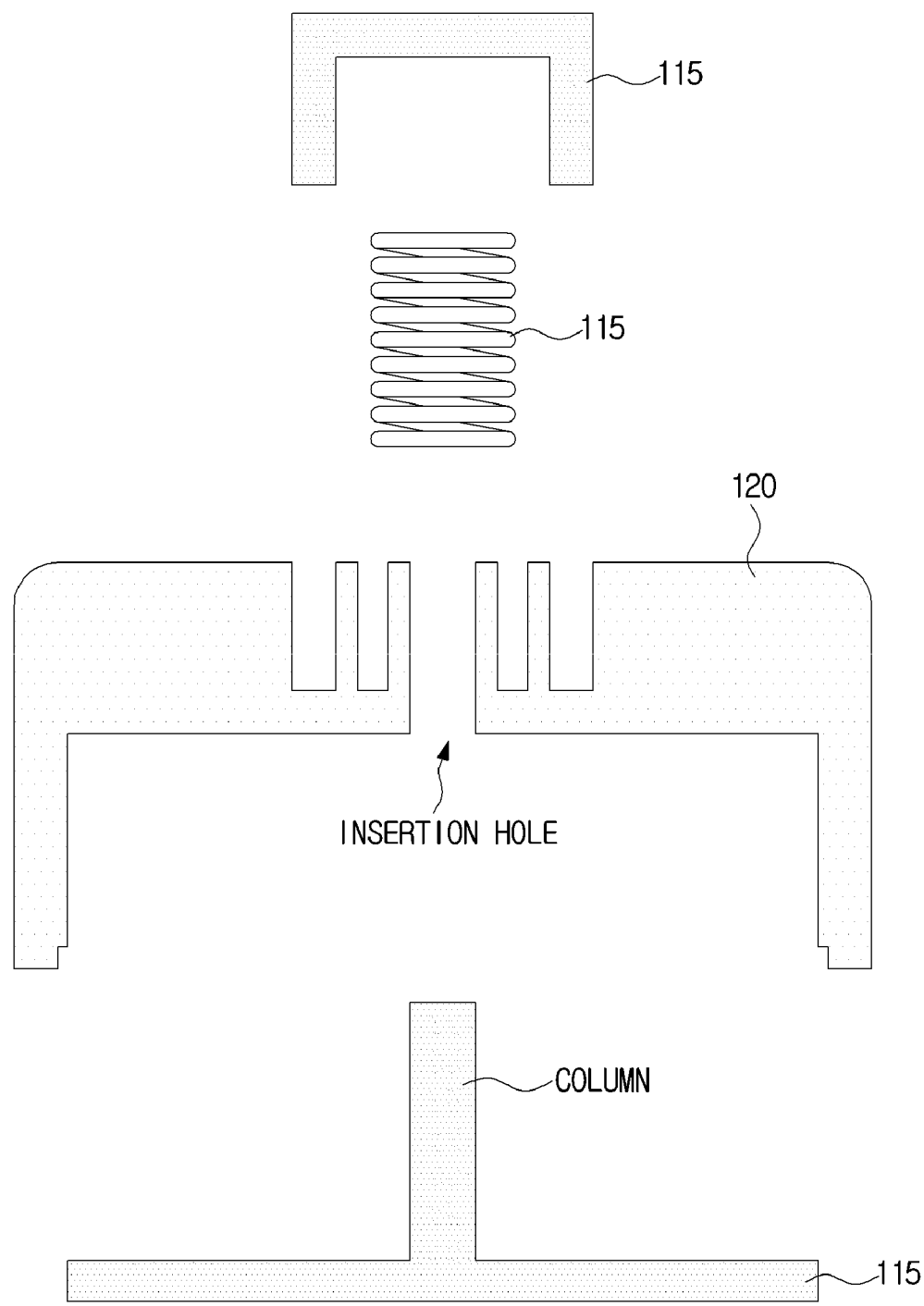

FIGS. 32 to 34 are diagrams illustrating a relation among touch units 105, a touch film 110, and a frame unit 115 included in a touch module 100 in accordance with a tenth embodiment of the present invention.

More specifically, FIGS. 32 to 34 illustrate embodiments in which a part of the plurality of touch units 105 including at least one touch unit 105 having a height different from those of the other touch units 105 is disposed on and fixed to the internal area 110b of the touch film 110, and the rest touch units of the plurality of touch units 105 are disposed on and fixed to the frame unit 115.

The touch module 100 of FIG. 32 includes the touch film 110 including the internal area 110b which disposes and fixes a part of the plurality of touch units 105 including at least one touch unit 105 having a height different from those of the other touch units 105, and the frame unit 115 which disposes and fixes the rest touch units 105 except the touch units 105 disposed on and fixed to the internal area 110b of the touch film 110, and a geometric relation in which a disposed position of the touch units 105 disposed on and fixed to the internal area 110b of the touch film 110 and a disposed position of the touch units 105 disposed on and fixed to the frame unit 115 are combined forms a predesigned unique geometric relation on design.

Referring to FIG. 32, the internal area 110b of the touch film 110 disposes and fixes a highest touch unit 105 among the plurality of touch units 105, and the highest touch unit 105 disposed on and fixed to the internal area 110b of the touch film 110 maintains a contacted state with the frame unit 115.

Referring to FIG. 33, the touch module 100 includes a housing unit 120 which fixes the touch film 110 and protects the touch units 105 dispersed and disposed on and fixed to the internal area 110b of the touch film 110 and the frame unit 115. The touch film 110 is fixed to the housing unit 120, and the touch units 105 dispersed and disposed on and fixed to the internal area 110b of the touch film 110 and the frame unit 115 are not visually exposed outside by the touch film 110 and the housing unit 120.

One side of the frame unit 115 protrudes outside of the housing unit 120 and receives electric capacitance of a human body which grasps the touch module 100 with a hand. Meanwhile, the frame unit 115 protruding outside of the housing unit 120 may be connected to a holder unit 130 which may be grasped by a hand of a human body, and the holder unit 130 may include a conductive material electrically connected to the frame unit 115.

Referring to FIG. 34, in the state that the contact area 110a of the touch film 110 contacts the capacitive touch screen, when a pressure is applied, the touch units 105 disposed on and fixed to the internal area 110b of the touch film 110 contact the frame unit 115 sequentially starting from the highest touch unit 105, and the touch units 105 disposed on and fixed to the frame unit 115 contact the internal area 110b of the touch film 110 sequentially starting from the highest touch unit 105. At this time, capacitance of the human body which applies the pressure is first applied to the touch units 105 disposed on and fixed to the frame unit 115, and also applied to the touch units 105 disposed on and fixed to the internal area 110b of the touch film 110 as the touch units 105 disposed on and fixed to the internal area 110b of the touch film 110 contact the frame unit 115.

Referring to FIG. 34, the highest touch unit 105 disposed on and fixed to the internal area 110b of the touch film 110 dispersed and disposed on and fixed to the internal area 110b of the touch film 110 and the frame unit 115 with different heights is first touched and recognized, and the rest touch units 105 are sequentially touched on the capacitive touch screen and recognized according to a predesigned unique geometric relation on design based on an order in which the touch units 105 disposed on and fixed to the internal area 110b of the touch film 110 contact the frame unit 115 and an order in which the touch units 105 disposed on and fixed to the frame unit 115 contact the internal area 110b of the touch film 110 by the pressure.

FIGS. 35 to 39 are diagrams illustrating a process of fabricating a touch module 100 in accordance with an embodiment of the present invention.

More specifically, like the embodiment of FIG. 15, FIGS. 35 to 39 illustrate a process of fabricating a touch module 100 in which touch units 105 having different heights are disposed on and fixed to the internal area 110b of the touch film 110 in a predesigned unique geometric relation on design and a specified distance or more between the touch units 105 and the frame unit 115 is maintained through the spring 125. Those skilled in the art may infer various embodiments (e.g., embodiments in which a part of steps or processes is omitted or the order is changed) for a fabrication process of the touch module 100 by referring to and/or modifying FIGS. 35 to 39, and the present invention includes all the embodiments which can be inferred, and the technical feature is not limited to embodiments illustrated in FIGS. 35 to 39. Further, those skilled in the art may infer a process of fabricating the touch module 100 corresponding to a relation of the touch units 105, the touch film 110, and the frame unit 115 of other embodiments by modifying the embodiments of FIGS. 35 to 39, and the present invention may include even the inferred embodiments in a scope of a patent.

Figure 35:
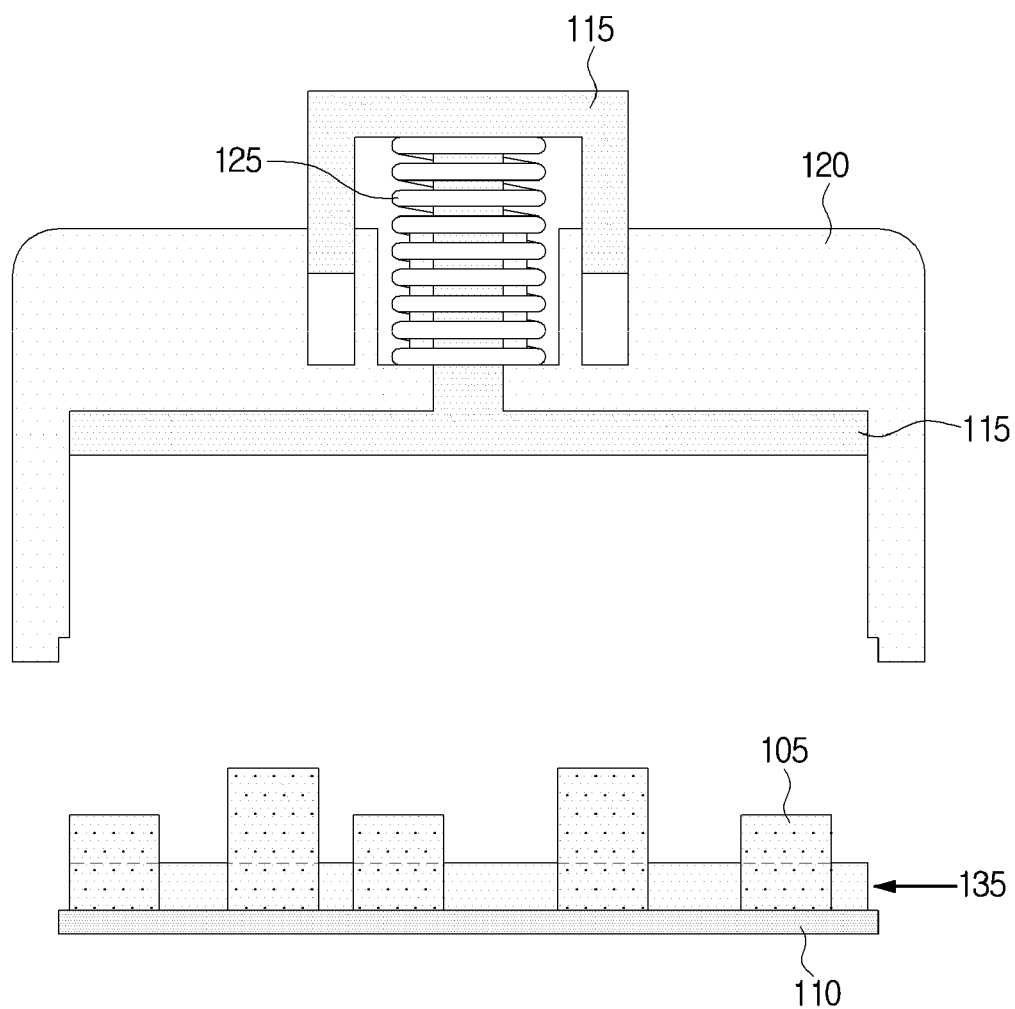
FIGS. 35 to 39 are diagrams illustrating a process of fabricating a touch module in accordance with an embodiment of the present invention.

Referring to FIG. 35, the plurality of touch units 105 in which at least one touch unit 105 having a height different from those of the other touch units 105, and the embedded plate unit 135 for embedding the plurality of touch units 105 are provided. A unique geometric relation to dispose the plurality of touch units 105 is designed, and embedded holes 140 are formed in the embedded plate unit 135 based on the designed unique geometric relation. When the plurality of touch units 105 are fixed to the internal area 110b of the touch film 110 according to the predesigned unique geometric relation on design through an automated robot process, the fabrication of the embedded plate unit 135 may be omitted.

The geometric relation on design may include at least one relation of a distance relation on design and an angle relation on design between centers of respective embedded holes 140, and combination of the distance relation on design and the angle relation on design between centers of respective embedded holes 140.

According to embodiments of the present invention, the geometric relation on design to dispose the plurality of embedded holes 140 may include a geometric relation in which one specified embedded hole 140 of the plurality of embedded holes 140 is disposed on and fixed to a fixed position predetermined on design. Here, the geometric relation on design may include at least one relation of a distance relation on design and an angle relation on design between a center of the specified embedded hole 140 and centers of the rest embedded holes 140, and combination of the distance relation on design and the angle relation on design between the center of the specified embedded hole 140 and the centers of the rest embedded holes 140. Meanwhile, the specified embedded hole 140 disposed on and fixed to a fixed position predetermined on design may be an indicator for determining a reference point of the geometric relation on design. Here, the geometric relation on design may include at least one relation of a distance relation on design and an angle relation on design between a reference point determined by the specified embedded hole 140 and centers of respective embedded holes 140, and combination of the distance relation on design and the angle relation on design between the reference point determined by the specified embedded hole 140 and the centers of respective embedded holes 140.

Figure 36:
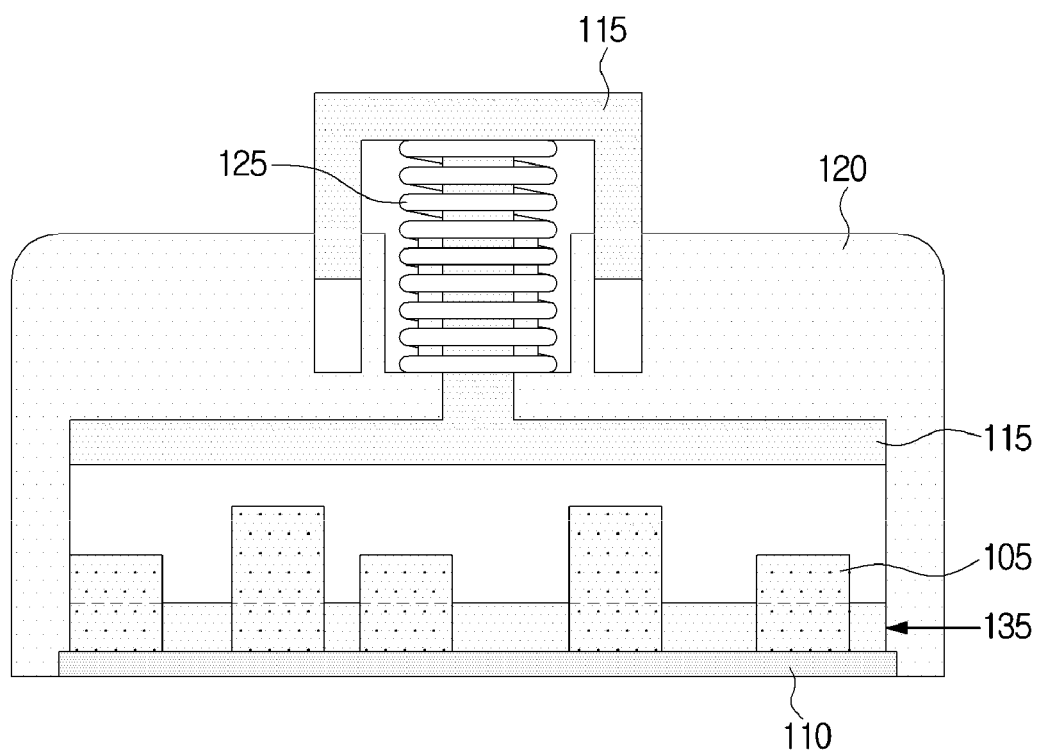

Referring to FIG. 36, the embedded plate unit 135 in which the embedded holes 140 are formed in the predesigned unique geometric relation on design is stacked on the internal area 110b of the touch film 110, and the plurality of touch units 105 are embedded in the embedded holes 140 of the embedded plate unit 135 and fixed to the internal area 110b of the touch film 110. The plurality of touch units 105 embedded in the embedded holes 140 of the embedded plate unit 135 form a geometric relation on design the same as a geometric relation on design of the embedded holes 140.

Meanwhile, when the plurality of touch units 105 are fixed to the internal area 110b of the touch film 110, the embedded plate may be removed.

Figure 37:
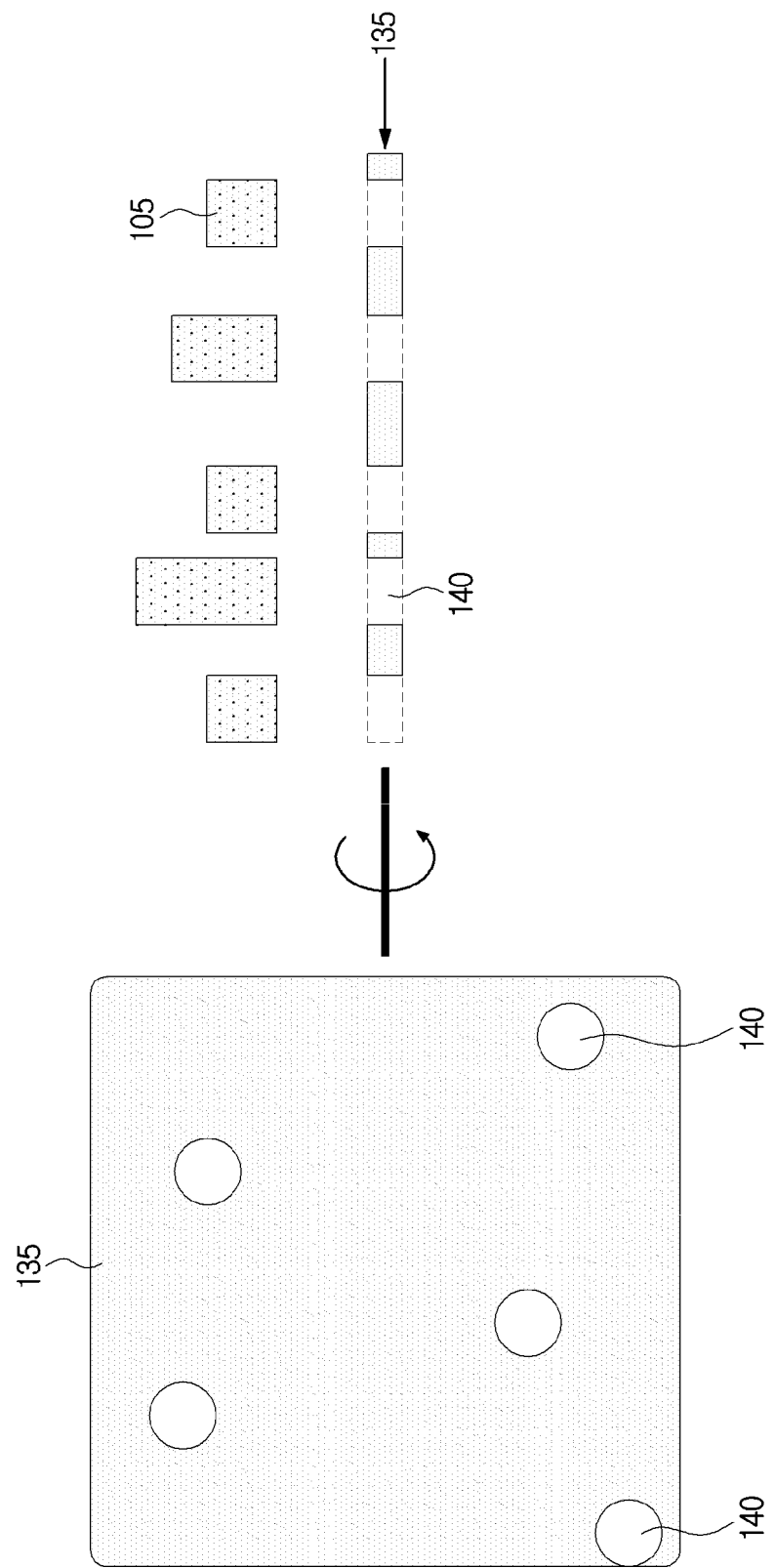

Referring to FIG. 37, the housing unit 120 to fix the touch film 110 is provided, an external frame unit 115 which is outside of the housing unit 120 and an internal frame unit 115 which is inside of the housing unit 120 are provided, the spring 125 included between the external frame unit 115 and the internal frame unit 115 is provided, and then a column of the internal frame unit 115 is inserted in an inserting hole of the housing unit 120 and combined with the external frame unit 115, and the spring 125 is positioned between the internal frame unit 115 and the external frame unit 115, and the internal frame unit 115 contacts the housing unit 120. The internal frame unit 115 and the external frame unit 115 may be coupled by a bolt coupling.

Figure 38:
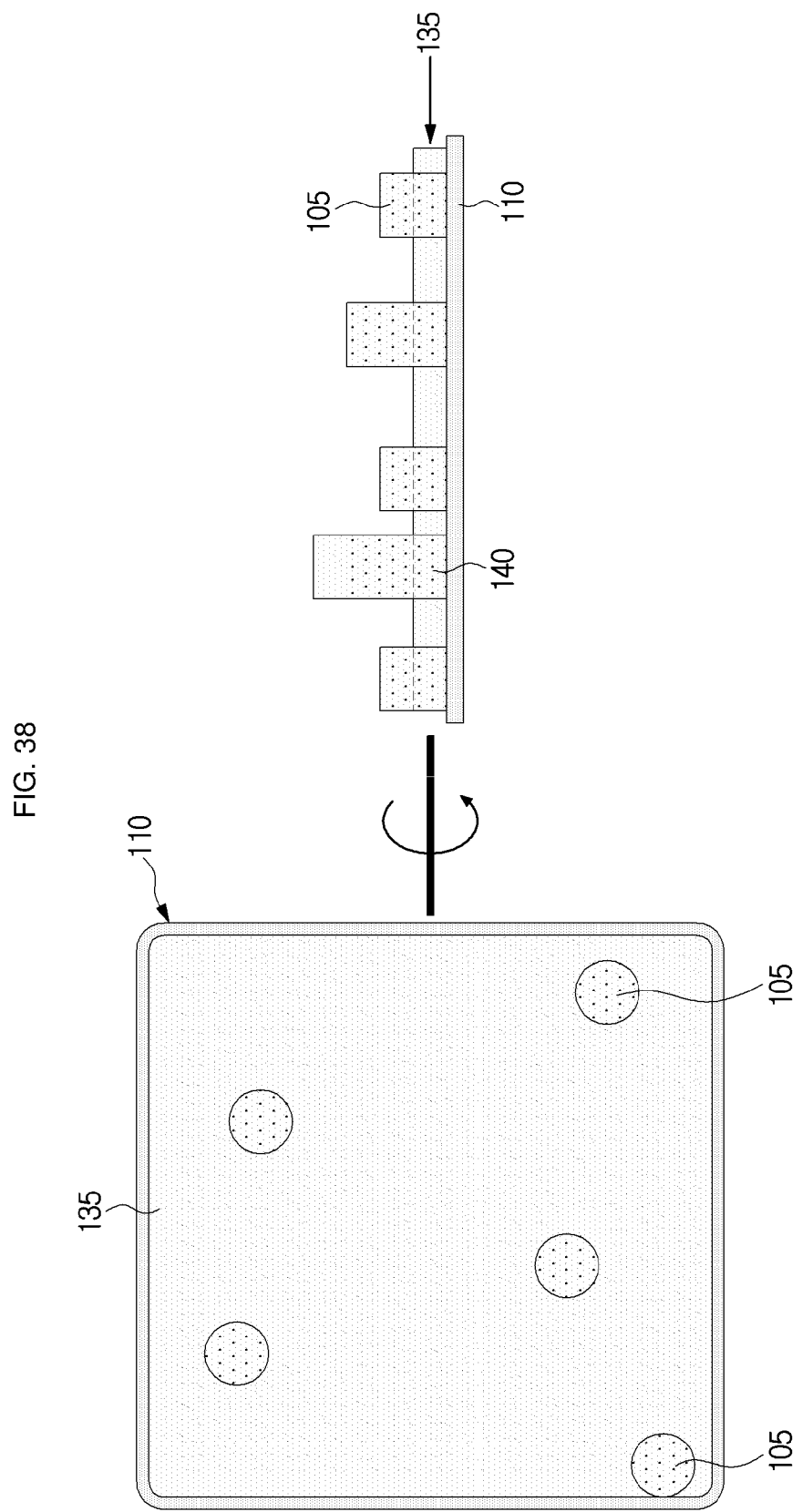
Figure 39:
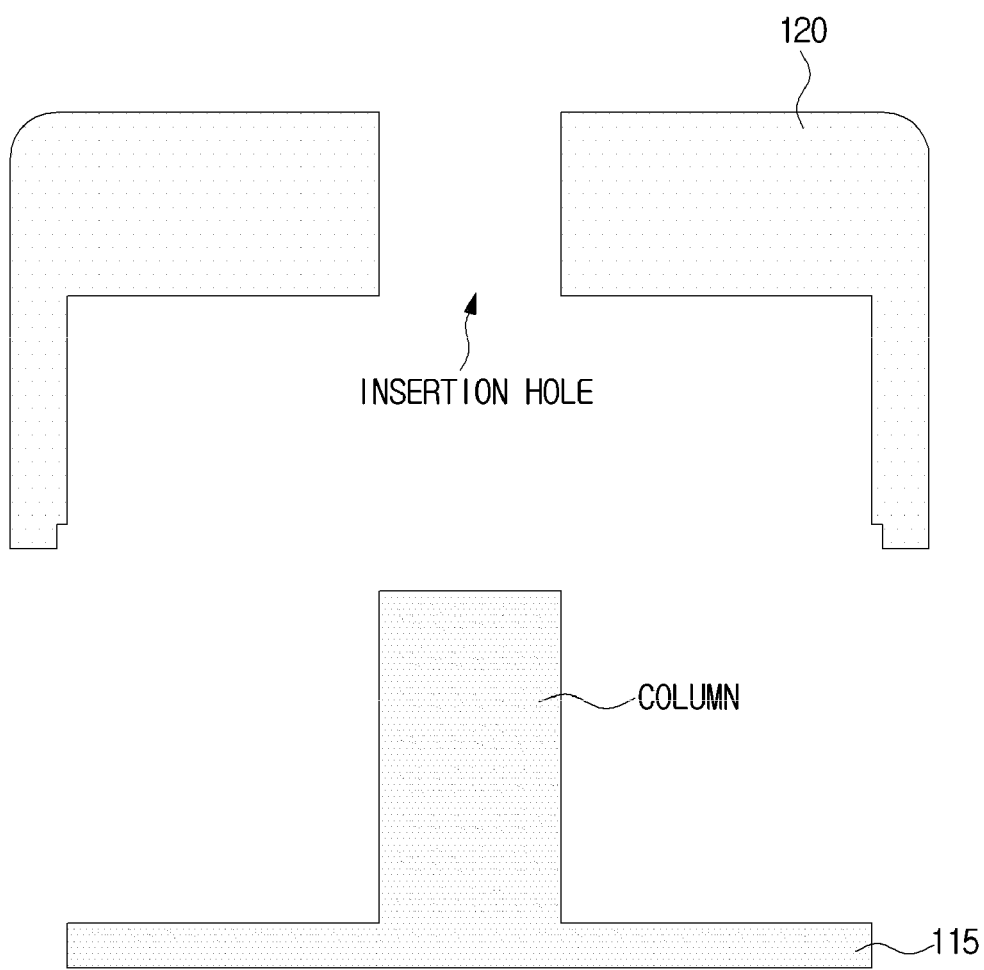

Referring to FIG. 38, the touch module 100 may be fabricated as shown in FIG. 39 by fixing the touch film 110 fabricated as FIG. 36 to the housing unit 120 fabricated through the process of FIG. 37.

FIGS. 40 to 44 are diagrams illustrating a process of fabricating a touch module in accordance with another embodiment of the present invention.

More specifically, like the embodiment of FIG. 24, FIGS. 40 to 44 illustrate a process of fabricating a touch module 100 in which touch units 105 having different heights are disposed on and fixed to the internal area 110b of the touch film 110 in a predesigned unique geometric relation on design. Those skilled in the art may infer various embodiments (e.g., embodiments in which a part of steps or processes is omitted or the order is changed) for a fabrication process of the touch module 100 by referring to and/or modifying FIGS. 40 to 44, and the present invention includes all the embodiments which can be inferred, and the technical feature is not limited to embodiments illustrated in FIGS. 40 to 44. Further, those skilled in the art may infer a process of fabricating the touch module 100 corresponding to a relation of the touch units 105, the touch film 110, and the frame unit 115 of other embodiments by modifying the embodiments of FIGS. 40 to 44, and the present invention may include even the inferred embodiments in a scope of a patent.

Figure 40:
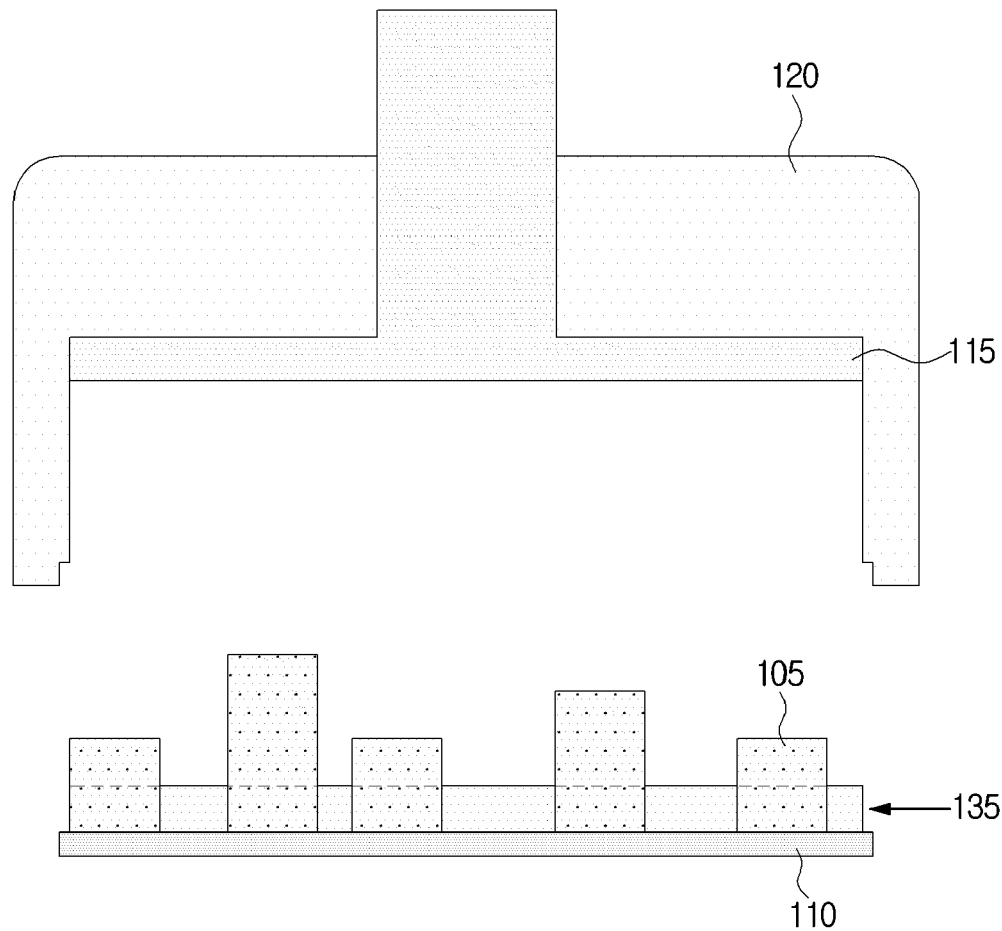
Figure 41:
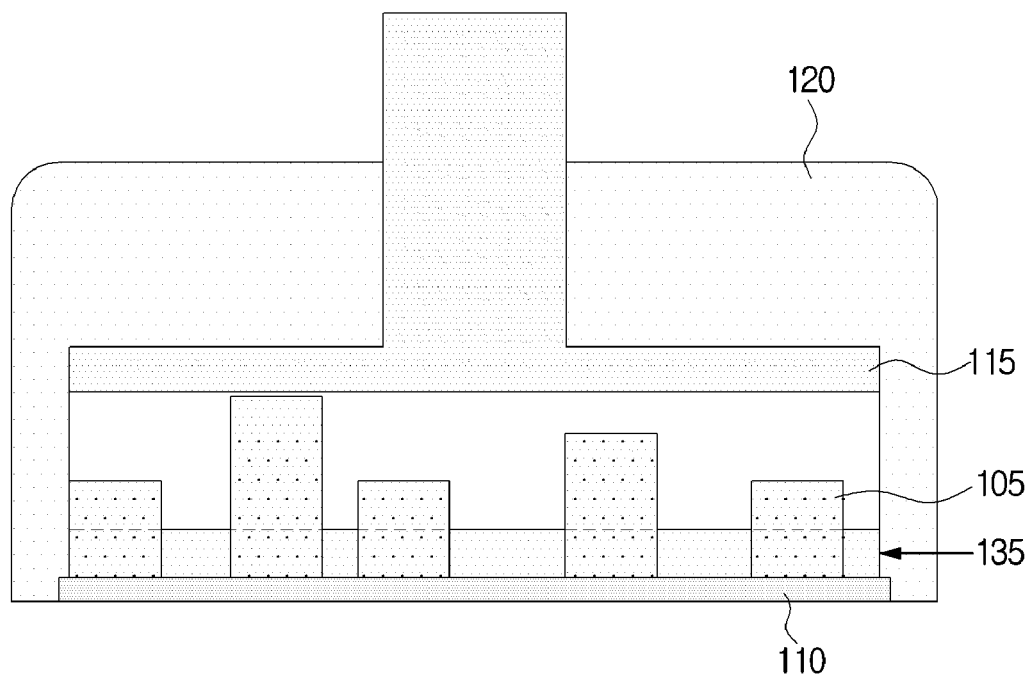

Referring to FIG. 40, the plurality of touch units 105 in which at least one touch unit 105 has a height different from those of the other touch units 105, and embedded plate unit 135 for embedding the plurality of touch units 105 are provided. A unique geometric relation for disposing the plurality of touch units 105 is designed, and embedded holes 140 are formed in the embedded plate unit 135 according to the designed unique geometric relation, and then as shown in FIG. 41, the embedded plate unit 135 is stacked on the touch film 110 and at the same time the plurality of touch units 105 are embedded in the embedded holes 140 of the holder unit 135 and fixed to the internal area 110b of the touch film 110. The plurality of touch units 105 fixed to the internal area 110b of the touch film 110 form a geometric relation on design the same as a geometric relation on design of the embedded holes 140.

Referring to FIG. 42, the housing unit 120 to fix the touch film 110 is provided, and the frame unit 115 included in the housing unit 120 is provided, and a column of the internal frame unit 115 is inserted in an inserting hole of the housing unit 120 as shown in FIG. 43, and then the touch module 100 may be fabricated as shown in FIG. 44 by fixing the touch film 110 fabricated as FIG. 41 to the housing unit 120.

The invention claimed is:

1. A multiple touch module touching a capacitive touch screen, comprising:
   a plurality of touch units each including a material which induces a capacitance change of the capacitive touch screen, and disposed in a geometric relation on a design projected on the capacitive touch screen in a predesigned unique geometric relation; and
   a touch film including a contact area which comes into contact with the capacitive touch screen, and configured to dispose and fix a certain number of touch units corresponding to the geometric relation on the design on an internal area included on an opposite side of the contact area, or to come into contact with the certain number of touch units corresponding to the geometric relation on the design through the internal area when the multiple touch module touches the capacitive touch screen; and
   a frame unit configured to be movable in a direction toward or away from the touch film, wherein the plurality of touch units are disposed in a space formed by the frame unit and the touch film.

2. The multiple touch module of claim 1, wherein the touch film includes a material capable of transferring capacitive touches of the plurality of touch units to the capacitive touch screen.

3. The multiple touch module of claim 1, wherein the touch film includes a material which blocks the geometric relation formed by the plurality of touch units so as not to be visually exposed.

4. The multiple touch module of claim 1, wherein each of the plurality of touch units includes a material configured to be restorable after contraction.

5. The multiple touch module of claim 1, wherein the plurality of touch units are configured to be disposed and fixed so that at least one touch unit is higher than the other touch units.

6. The multiple touch module of claim 5, wherein the plurality of touch units are configured to touch the capacitive touch screen in a capacitive mode sequentially starting from a highest touch unit.

7. The multiple touch module of claim 1, wherein the frame unit applies a capacitance of a human body to the touch units.

8. The multiple touch module of claim 1, wherein the geometric relation on the design includes at least one relation of a distance relation and an angle relation between centers of respective touch units.

9. The multiple touch module of claim 1, wherein the geometric relation on the design includes a geometric relation in which any one specified touch unit of the plurality of touch units is disposed and fixed on a certain position on the design.

10. The multiple touch module of claim 9, wherein the geometric relation on the design includes at least one relation of a distance relation and an angle relation between a center of the specified touch unit and centers of the remaining touch units.

11. The multiple touch module of claim 9, wherein the geometric relation on the design includes at least one relation of a distance relation and an angle relation between a reference point determined by the specified touch unit and centers of each of the touch units.

12. The multiple touch module of claim 1, wherein the frame unit disposes and fixes the plurality of touch units corresponding to the geometric relation on the design, and wherein the touch film is configured to come into contact with the touch units disposed on and fixed to the frame unit through the internal area.

13. The multiple touch module of claim 12, wherein the touch film is configured to come into contact with the touch units disposed on and fixed to the frame unit by a pressure applied in one side direction when the multiple touch module touches the capacitive touch screen.

14. The multiple touch module of claim 12, further comprising a spring which separates the touch units disposed on and fixed to the frame unit from the touch film by a certain distance or more before the multiple touch module touches the capacitive touch screen.

15. The multiple touch module of claim 12, wherein the touch film is configured to be separated from the touch units disposed on and fixed to the frame unit by a certain distance or more before the multiple touch module touches the capacitive touch screen, and is then configured to come into contact with the touch units disposed on and fixed to the frame unit by a pressure applied in one side direction when the multiple touch module touches the capacitive touch screen.

16. The multiple touch module of claim 12, wherein the frame unit is configured to dispose and fix the plurality of touch units so that at least one touch unit of the plurality of touch units is higher than the other touch units.

17. The multiple touch module of claim 16, wherein the touch film is configured to maintain a contact state with a highest touch unit disposed on and fixed to the frame unit.

18. The multiple touch module of claim 1, wherein the touch film disposes and fixes a part of the plurality of touch units corresponding to the geometric relation on the design, and the frame unit is configured to dispose and fix the remaining touch units of the plurality of touch units corresponding to the geometric relation on the design.

19. The multiple touch module of claim 18, wherein the touch film is configured to come into contact with the remaining touch units disposed on and fixed to the frame unit through the internal area.

20. The multiple touch module of claim 18, wherein the frame unit is configured to come into contact with a part of the touch units disposed on and fixed to the internal area of the touch film.

21. The multiple touch module of claim 18, wherein the frame unit is configured to come into contact with the touch units disposed on and fixed to the internal area of the touch film by a pressure applied in one side direction when the multiple touch module touches the capacitive touch screen.

22. The multiple touch module of claim 18, wherein the touch film is configured to come into contact with the touch units disposed on and fixed to the frame unit by a pressure applied in one side direction when the multiple touch module touches the capacitive touch screen.

23. The multiple touch module of claim 18, further comprising a spring which maintains a state in which the touch units disposed on and fixed to the frame unit are separated from the touch film by a certain distance or more, or maintain a state in which he touch units disposed on and fixed to the internal area of the touch film are separated from the frame unit by a certain distance or more before the multiple touch module touches the capacitive touch screen.

24. The multiple touch module of claim 18, wherein the frame unit is configured to be separated from the touch units disposed on and fixed to the internal area of the touch film by a certain distance or more before the multiple touch module touches the capacitive touch screen, and is then configured to come into contact with the touch units disposed on and fixed to the internal area of the touch film by a pressure applied in one side direction when the multiple touch module touches the capacitive touch screen.

25. The multiple touch module of claim 18, wherein the touch film is configured to be separated from the touch units disposed on and fixed to the frame unit by a certain distance or more before the multiple touch module touches the capacitive touch screen, and is then configured to come into contact with the touch units disposed on and fixed to the frame unit by a pressure applied in one side direction when the multiple touch module touches the capacitive touch screen.

26. The multiple touch module of claim 18, wherein the frame unit is configured to dispose and fix the plurality of touch units so that at least one touch unit of the plurality of touch units is higher than the other touch units.

27. The multiple touch module of claim 26, wherein the touch film is configured to maintain a contact state with a highest touch unit disposed on and fixed to the frame unit.

28. The multiple touch module of claim 18, wherein the touch film is configured to dispose and fix the plurality of touch units so that at least one touch unit of the plurality of touch units is higher than the other touch units.

29. The multiple touch module of claim 27, wherein the frame unit is configured to maintain a contact state with a highest touch unit disposed on or fixed to the internal area of the touch film.

30. The multiple touch module of claim 1, wherein the touch film disposes and fixes the plurality of touch units corresponding to the geometric relation on the design, and the frame unit is configured to come into contact with the touch units disposed on and fixed to the internal area of the touch film.

31. The multiple touch module of claim 30, wherein the frame unit is configured to come into contact with the touch units disposed on and fixed to the internal area of the touch film by a pressure applied in one side direction when the multiple touch module touches the capacitive touch screen.

32. The multiple touch module of claim 30, further comprising a spring which maintains a state in which the touch units disposed on and fixed to the internal area of the touch film are separated from the frame unit by a certain distance or more before the multiple touch module touches the capacitive touch screen.

33. The multiple touch module of claim 30, wherein the frame unit is configured to be separated from the touch units disposed on and fixed to the internal area of the touch film by a certain distance or more before the multiple touch module touches the capacitive touch screen, and is then configured to come into contact with the touch units disposed on and fixed to the internal area of the touch film by a pressure applied in one side direction when the multiple touch module touches the capacitive touch screen.

34. The multiple touch module of claim 30, wherein the plurality of touch units is configured to be disposed and fixed so that at least one touch unit of the plurality of touch units is higher than the other touch units.

35. The multiple touch module of claim 33, wherein the frame unit is configured to maintain a contact state with a highest touch unit disposed on and fixed to the internal area.

36. A multiple touch module touching a capacitive touch screen, comprising:
  a plurality of touch units each including a material which induces a capacitance change of the capacitive touch screen, and disposed in a geometric relation on a design projected on the capacitive touch screen in a predesigned unique geometric relation;
  a frame unit configured to dispose and fix the plurality of touch units corresponding to the geometric relation on the design in the geometric relation on the design; and
  a touch film including a contact area which comes into contact with the capacitive touch screen, and configured to come into contact with the touch units disposed and fixed to the frame unit through an internal area provided on an opposite side of the contact area,
  wherein the frame unit is configured to be movable in a direction toward or away from the touch film, wherein the plurality of touch units are disposed in a space formed by the frame unit and the touch film.

37. A multiple touch module touching a capacitive touch screen, comprising:
  a plurality of touch units each including a material which induces a capacitance change of the capacitive touch screen, and disposed in a geometric relation on a design projected on the capacitive touch screen in a predesigned unique geometric relation;
  a touch film including a contact area which comes into contact with the capacitive touch screen, and configured to dispose and fix a part of the plurality of touch units corresponding to the geometric relation on the design on an internal area provided on an opposite side of the contact area; and
  a frame unit configured to dispose and fix touch units excluding touch units disposed on and fixed to an internal area of the touch film of the plurality of touch units, the frame unit configured to be movable in a direction toward or away from the touch film, wherein the plurality of touch units are disposed in a space formed by the frame unit and the touch film.

38. The multiple touch module of claim 37, wherein the touch film is configured to come into contact with the touch units disposed on and fixed to the frame unit, and the frame unit is configured to come into contact with the touch units disposed on and fixed to the internal area of the touch film.

39. A multiple touch module touching a capacitive touch screen, comprising:
  a plurality of touch units each including a material which induces a capacitance change of the capacitive touch screen, and disposed in a geometric relation on a design projected on the capacitive touch screen in a predesigned unique geometric relation;
  a touch film including a contact area which comes into contact with the capacitive touch screen, and configured to dispose and fix in the geometric relation on the design the plurality of touch units corresponding to the geometric relation on the design on an internal area provided on an opposite side of the contact area; and
  a frame unit configured to come into contact with the touch units disposed and fixed to the internal area of the touch film, the frame unit configured to be movable in a direction toward or away from the touch film, wherein the plurality of touch units are disposed in a space formed by the frame unit and the touch film.

40. The multiple touch module of claim 36, wherein the plurality of touch units is configured to be disposed and fixed so that at least one touch unit is higher than the other touch units.

* * * * *